US012804597B2

(12) United States Patent
Yerramalli et al.

(10) Patent No.: US 12,804,597 B2
(45) Date of Patent: Nov. 17, 2026

(54) POST-MEASUREMENT ASSISTANCE DATA FOR POSITIONING

(71) Applicant: QUALCOMM Incorporated, San Diego, CA (US)

(72) Inventors: Srinivas Yerramalli, San Diego, CA (US); Marwen Zorgui, San Diego, CA (US); Rajat Prakash, San Diego, CA (US); Piyush Gupta, Bridgewater, NJ (US); Xiaojie Wang, Hillsborough, NJ (US); Xiaoxia Zhang, San Diego, CA (US); Junyi Li, Greentown, PA (US)

(73) Assignee: QUALCOMM Incorporated, San Diego, CA (US)

( * ) Notice: Subject to any disclaimer, the term of this patent is extended or adjusted under 35 U.S.C. 154(b) by 277 days.

(21) Appl. No.: 18/693,088

(22) PCT Filed: Aug. 30, 2022

(86) PCT No.: PCT/US2022/075630

§ 371 (c)(1),
(2) Date: Mar. 18, 2024

(87) PCT Pub. No.: WO2023/049612

PCT Pub. Date: Mar. 30, 2023

(65) Prior Publication Data

US 2024/0389068 A1 Nov. 21, 2024

(30) Foreign Application Priority Data

Sep. 24, 2021 (IN) ............................. 202141043310

(51) Int. Cl.
*H04W 64/00* (2009.01)
*H04W 72/25* (2023.01)
*H04W 72/563* (2023.01)

(52) U.S. Cl.
CPC ......... *H04W 64/006* (2013.01); *H04W 72/25* (2023.01); *H04W 72/563* (2023.01)

(58) Field of Classification Search
CPC ... H04W 64/00; H04W 64/006; H04W 72/25; H04W 72/563; G01S 13/765
See application file for complete search history.

(56) References Cited

U.S. PATENT DOCUMENTS 11,330,549 B2 * 5/2022 Zhang .................. H04W 64/00
11,353,542 B2 * 6/2022 Da ......................... G01S 5/0072
(Continued)

FOREIGN PATENT DOCUMENTS

EP 3742829 A1 * 11/2020 ............ H04W 72/23
EP 4017035 A1 * 6/2022 ............ H04W 4/025
(Continued)

OTHER PUBLICATIONS

International Search Report and Written Opinion—PCT/US2022/075630—ISA/EPO—Dec. 16, 2022.
(Continued)

*Primary Examiner* — Hai V Nguyen
(74) *Attorney, Agent, or Firm* — QUALCOMM Incorporated

(57) ABSTRACT

In an aspect, a user equipment (UE) may receive positioning assistance data from a location server, wherein the positioning assistance data identifies one or more first positioning reference signal (PRS) resources for measurement by the UE during a positioning session between the UE and a location server. The UE may receive post-measurement positioning assistance data from at least one sidelink device located within a threshold distance to the UE, wherein the post-measurement positioning assistance data received from the at least one sidelink device is based on measurements of one or more second PRS resources obtained by the at least one
(Continued)

sidelink device during a positioning session of the at least one sidelink device. The UE may selectively measure at least a subset of the one or more first PRS resources based on the post-measurement positioning assistance data received from the at least one sidelink device.

30 Claims, 19 Drawing Sheets

(56) References Cited

U.S. PATENT DOCUMENTS

| | | | | |
|---|---|---|---|---|
| 11,903,026 | B2 * | 2/2024 | Baek | G01S 13/765 |
| 11,929,952 | B2 * | 3/2024 | Wu | H04W 4/40 |
| 12,092,750 | B2 * | 9/2024 | Fakoorian | G01S 5/0072 |
| 12,096,392 | B2 * | 9/2024 | Nam | G01S 1/042 |
| 12,101,686 | B2 * | 9/2024 | Xiao | H04W 4/023 |
| 12,149,478 | B2 * | 11/2024 | Qi | H04W 72/0446 |
| 12,150,085 | B2 * | 11/2024 | Edge | H04W 4/02 |
| 12,167,362 | B2 * | 12/2024 | Vassilovski | G01S 13/765 |
| 12,248,082 | B2 * | 3/2025 | Morrison | G01S 19/42 |
| 12,252,274 | B2 * | 3/2025 | Jee | G01S 5/0218 |
| 12,422,541 | B2 * | 9/2025 | Narula | H04W 4/40 |
| 12,477,503 | B2 * | 11/2025 | Bao | G01S 5/0072 |
| 2017/0318592 | A1 * | 11/2017 | Chu | H04L 1/0027 |
| 2020/0408871 | A1 * | 12/2020 | Da | G01S 5/0072 |
| 2021/0058889 | A1 * | 2/2021 | Zhang | G01S 11/04 |
| 2021/0160810 | A1 * | 5/2021 | Zhang | G01S 5/10 |
| 2022/0279310 | A1 * | 9/2022 | Xiao | H04W 4/023 |
| 2022/0377810 | A1 * | 11/2022 | Bhamri | H04B 7/06966 |
| 2023/0105526 | A1 * | 4/2023 | Wu | H04W 4/02<br>370/329 |
| 2023/0199695 | A1 * | 6/2023 | Vassilovski | H04W 64/006<br>455/456.1 |
| 2023/0247596 | A1 * | 8/2023 | Selvanesan | H04W 4/44<br>370/329 |
| 2023/0382565 | A1 * | 11/2023 | Jee | G01S 5/0218 |
| 2023/0384412 | A1 * | 11/2023 | Morrison | G01S 19/42 |
| 2024/0106602 | A1 * | 3/2024 | Bao | H04L 5/0051 |
| 2024/0129883 | A1 * | 4/2024 | Manolakos | H04L 5/0073 |
| 2024/0305357 | A1 * | 9/2024 | Kumar | G01S 5/0205 |
| 2026/0067912 | A1 * | 3/2026 | Guan | G06N 3/045 |

FOREIGN PATENT DOCUMENTS

| | | | | |
|---|---|---|---|---|
| WO | 2021027861 A1 | | 2/2021 | |
| WO | 2022212974 A1 | | 10/2022 | |
| WO | WO-2023049552 A1 | * | 3/2023 | H04W 92/18 |

OTHER PUBLICATIONS

VIVO: "Discussion on Potential Positioning Enhancements", 3GPP TSG RAN WG1 #102-e, R1-2005381, 3rd Generation Partnership Project, Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 8, 2020, XP051917406, 20 Pages, Paragraph "6 Consideration for NLOS scenario", Section 5, The whole document, pp. 12-13.

* cited by examiner

POST-MEASUREMENT ASSISTANCE DATA FOR POSITIONING

CROSS-REFERENCE TO RELATED APPLICATIONS

The present Application for Patent claims the benefit of IN application Ser. No. 202141043310, entitled "POST-MEASUREMENT ASSISTANCE DATA FOR POSITIONING", filed Sep. 24, 2021, and is a national stage application, filed under 35 U.S.C. § 371, of International Patent Application No. PCT/US2022/075630, entitled. "POST-MEASUREMENT ASSISTANCE DATA FOR POSITIONING", filed Aug. 30, 2022, both of which are assigned to the assignee hereof and are expressly incorporated herein by reference in their entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) includes receiving positioning assistance data from a location server, wherein the positioning assistance data identifies one or more first positioning reference signal (PRS) resources for measurement by the UE during a positioning session between the UE and a location server; receiving post-measurement positioning assistance data from at least one sidelink device located within a threshold distance to the UE, wherein the post-measurement positioning assistance data received from the at least one sidelink device is based on measurements of one or more second PRS resources obtained by the at least one sidelink device during a positioning session of the at least one sidelink device; and selectively measuring at least a subset of the one or more first PRS resources based on the post-measurement positioning assistance data received from the at least one sidelink device.

In an aspect, a method of wireless communication performed by a first user equipment (UE) includes measuring one or more first positioning reference signal (PRS) resources in a positioning session between a location server and the first UE; sending post-measurement positioning assistance data to a second UE, wherein the post-measurement positioning assistance data sent to the second UE is based on measurements of the one or more first PRS resources obtained during the positioning session between the location server and the first UE.

In an aspect, a user equipment (UE) includes a memory: at least one transceiver; and at least one processor communicatively coupled to the memory and the at least one transceiver, the at least one processor configured to: receive, via the at least one transceiver, positioning assistance data from a location server, wherein the positioning assistance data identifies one or more first positioning reference signal (PRS) resources for measurement by the UE during a positioning session between the UE and a location server; receive, via the at least one transceiver, post-measurement positioning assistance data from at least one sidelink device located within a threshold distance to the UE, wherein the post-measurement positioning assistance data received from the at least one sidelink device is based on measurements of one or more second PRS resources obtained by the at least one sidelink device during a positioning session of the at least one sidelink device; and selectively measure at least a subset of the one or more first PRS resources based on the post-measurement positioning assistance data received from the at least one sidelink device.

In an aspect, a first user equipment (UE) includes a memory; at least one transceiver; and at least one processor communicatively coupled to the memory and the at least one transceiver, the at least one processor configured to: measure one or more positioning reference signal (PRS) resources in a positioning session between a location server and the first UE; send, via the at least one transceiver, post-measurement positioning assistance data to a second UE, wherein the post-measurement positioning assistance data sent to the second UE is based on measurements of the one or more PRS resources obtained during the positioning session between the location server and the first UE.

In an aspect, a user equipment (UE) includes means for receiving positioning assistance data from a location server, wherein the positioning assistance data identifies one or more first positioning reference signal (PRS) resources for measurement by the UE during a positioning session between the UE and a location server; means for receiving post-measurement positioning assistance data from at least one sidelink device located within a threshold distance to the UE, wherein the post-measurement positioning assistance data received from the at least one sidelink device is based on measurements of one or more second PRS resources obtained by the at least one sidelink device during a positioning session of the at least one sidelink device; and means for selectively measuring at least a subset of the one or more PRS resources based on the post-measurement positioning assistance data received from the at least one sidelink device.

In an aspect, a first user equipment (UE) includes means for measuring one or more first positioning reference signal (PRS) resources in a positioning session between a location server and the first UE; means for sending post-measurement positioning assistance data to a second UE, wherein the post-measurement positioning assistance data sent to the second UE is based on measurements of the one or more first PRS resources obtained during the positioning session between the location server and the first UE.

In an aspect, a non-transitory computer-readable medium storing computer-executable instructions that, when executed by a user equipment (UE), cause the UE to: receive positioning assistance data from a location server, wherein the positioning assistance data identifies one or more first positioning reference signal (PRS) resources for measurement by the UE during a positioning session between the UE and a location server; receive post-measurement positioning assistance data from at least one sidelink device located within a threshold distance to the UE, wherein the post-measurement positioning assistance data received from the at least one sidelink device is based on measurements of one or more second PRS resources obtained by the at least one sidelink device during a positioning session of the at least one sidelink device; and selectively measure at least a subset of the one or more first PRS resources based on the post-measurement positioning assistance data received from the at least one sidelink device.

In an aspect, a non-transitory computer-readable medium storing computer-executable instructions that, when executed by a first user equipment (UE), cause the UE to: measure one or more first positioning reference signal (PRS) resources in a positioning session between a location server and the first UE; send post-measurement positioning assistance data to a second UE, wherein the post-measurement positioning assistance data sent to the second UE is based on measurements of the one or more first PRS resources obtained during the positioning session between the location server and the first UE.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
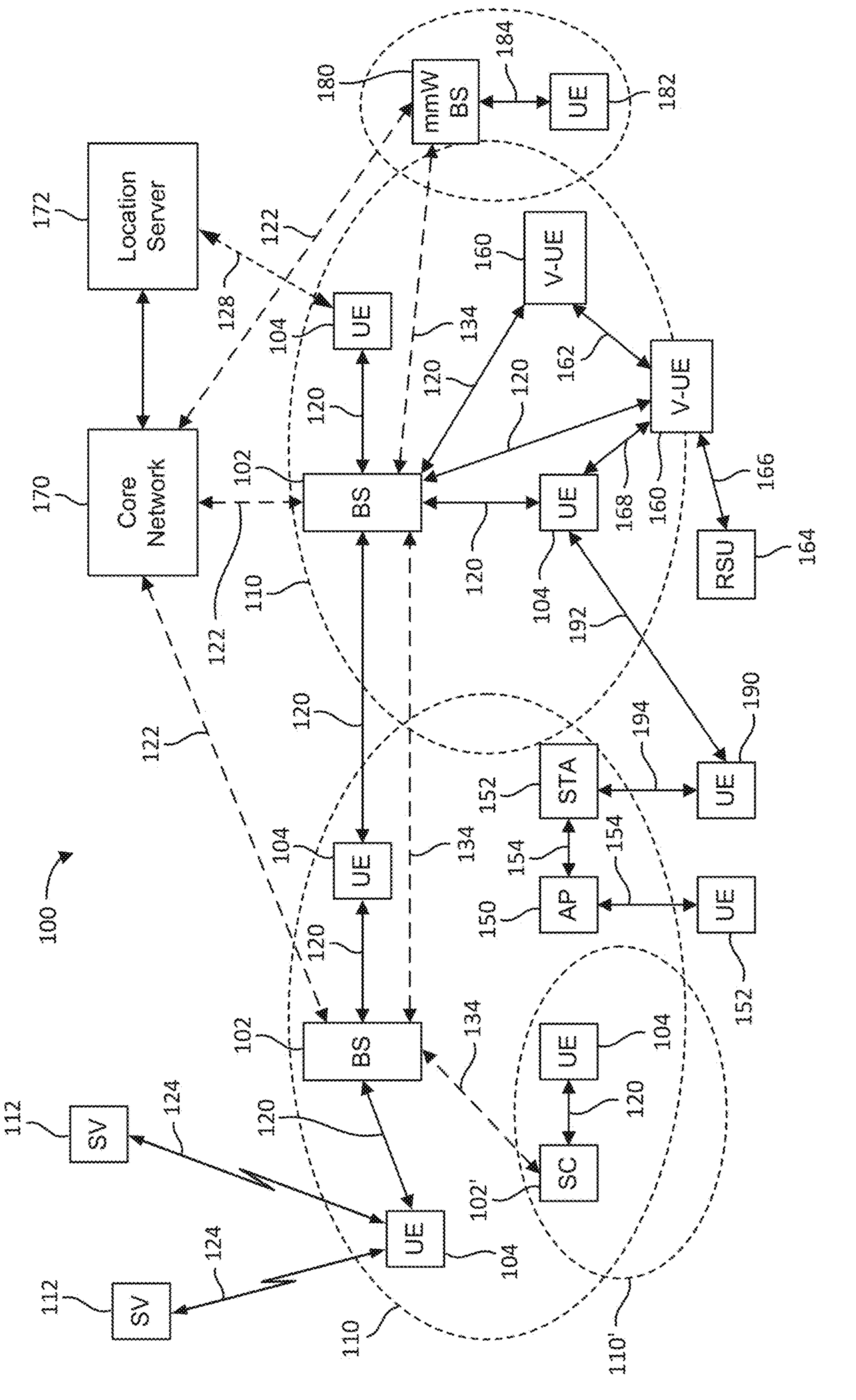
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station." a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labelled "BS") and various UEs 104. The base stations 102 may include macro cell base stations (high power cellular base stations) and/or small cell base stations (low power cellular base stations). In an aspect, the macro cell base stations 102 may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (cMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labelled "SC" for "small cell") may have a geographic coverage arca 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a mmW base station 180 that may operate in millimeter wave (mmW) frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mm W/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

Leveraging the increased data rates and decreased latency of NR, among other things, vehicle-to-everything (V2X) communication technologies are being implemented to support intelligent transportation systems (ITS) applications, such as wireless communications between vehicles (vehicle-to-vehicle (V2V)), between vehicles and the roadside infrastructure (vehicle-to-infrastructure (V2I)), and between vehicles and pedestrians (vehicle-to-pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide. Once fully implemented, the technology is expected to reduce unimpaired vehicle crashes by 80%.

Still referring to FIG. 1, the wireless communications system 100 may include multiple V-UEs 160 that may communicate with base stations 102 over communication links 120 using the Uu interface (i.e., the air interface between a UE and a base station). V-UEs 160 may also communicate directly with each other over a wireless sidelink 162, with a roadside unit (RSU) 164 (a roadside access point) over a wireless sidelink 166, or with sidelink-capable UEs 104 over a wireless sidelink 168 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, V2V communication, V2X communication (e.g., cellular V2X (cV2X) communication, enhanced V2X (eV2X) communication, etc.), emergency rescue applications, etc. One or more of a group of V-UEs 160 utilizing sidelink communications may be within the geographic coverage area 110 of a base station 102. Other V-UEs 160 in such a group may be outside the geographic coverage area 110 of a base station 102 or be otherwise unable to receive transmissions from a base station 102. In some cases, groups of V-UEs 160 communicating via sidelink communications may utilize a one-to-many (1:M) system in which each V-UE 160 transmits to every other V-UE 160 in the group. In some cases, a base station 102 facilitates the scheduling of resources for sidelink communications. In other cases, sidelink communications are carried out between V-UEs 160 without the involvement of a base station 102.

In an aspect, the sidelinks 162, 166, 168 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs.

In an aspect, the sidelinks 162, 166, 168 may be cV2X links. A first generation of cV2X has been standardized in LTE, and the next generation is expected to be defined in NR. cV2X is a cellular technology that also enables device-to-device communications. In the U.S. and Europe, cV2X is expected to operate in the licensed ITS band in sub-6 GHz. Other bands may be allocated in other countries. Thus, as a particular example, the medium of interest utilized by sidelinks 162, 166, 168 may correspond to at least a portion of the licensed ITS frequency band of sub-6 GHz. However, the present disclosure is not limited to this frequency band or cellular technology.

In an aspect, the sidelinks 162, 166, 168 may be dedicated short-range communications (DSRC) links. DSRC is a one-way or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHz (5.85-5.925 GHz) in the U.S. In Europe, IEEE 802.11p operates in the ITS G5A band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHz) is intended for other services of interest to drivers, such as road rules, tolling, parking automation, etc. Thus, as a particular example, the mediums of interest utilized by sidelinks 162, 166, 168 may correspond to at least a portion of the licensed ITS frequency band of 5.9 GHz.

Alternatively, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Communications between the V-UEs 160 are referred to as V2V communications, communications between the V-UEs 160 and the one or more RSUs 164 are referred to as V2I communications, and communications between the V-UEs 160 and one or more UEs 104 (where the UEs 104 are P-UEs) are referred to as V2P communications. The V2V communications between V-UEs 160 may include, for example, information about the position, speed, acceleration, heading, and other vehicle data of the V-UEs 160. The V2I information received at a V-UE 160 from the one or more RSUs 164 may include, for example, road rules, parking automation information, etc. The V2P communications between a V-UE 160 and a UE 104 may include information about, for example, the position, speed, acceleration, and heading of the V-UE 160 and the position, speed (e.g., where the UE 104 is carried by a user on a bicycle), and beading of the UE 104.

Note that although FIG. 1 only illustrates two of the UEs as V-UEs (V-UEs 160), any of the illustrated UEs (e.g., UEs 104, 152, 182, 190) may be V-UEs. In addition, while only the V-UEs 160 and a single UE 104 have been illustrated as being connected over a sidelink, any of the UEs illustrated in FIG. 1, whether V-UEs, P-UEs, etc., may be capable of sidelink communication. Further, although only UE 182 was described as being capable of beam forming, any of the illustrated UEs, including V-UEs 160, may be capable of beam forming. Where V-UEs 160 are capable of beam forming, they may beam form towards each other (i.e., towards other V-UEs 160), towards RSUs 164, towards other UEs (e.g., UEs 104, 152, 182, 190), etc. Thus, in some cases, V-UEs 160 may utilize beamforming over sidelinks 162, 166, and 168.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on. As another example, the D2D P2P links 192 and 194 may be sidelinks, as described above with reference to sidelinks 162, 166, and 168.

Figure 2A:
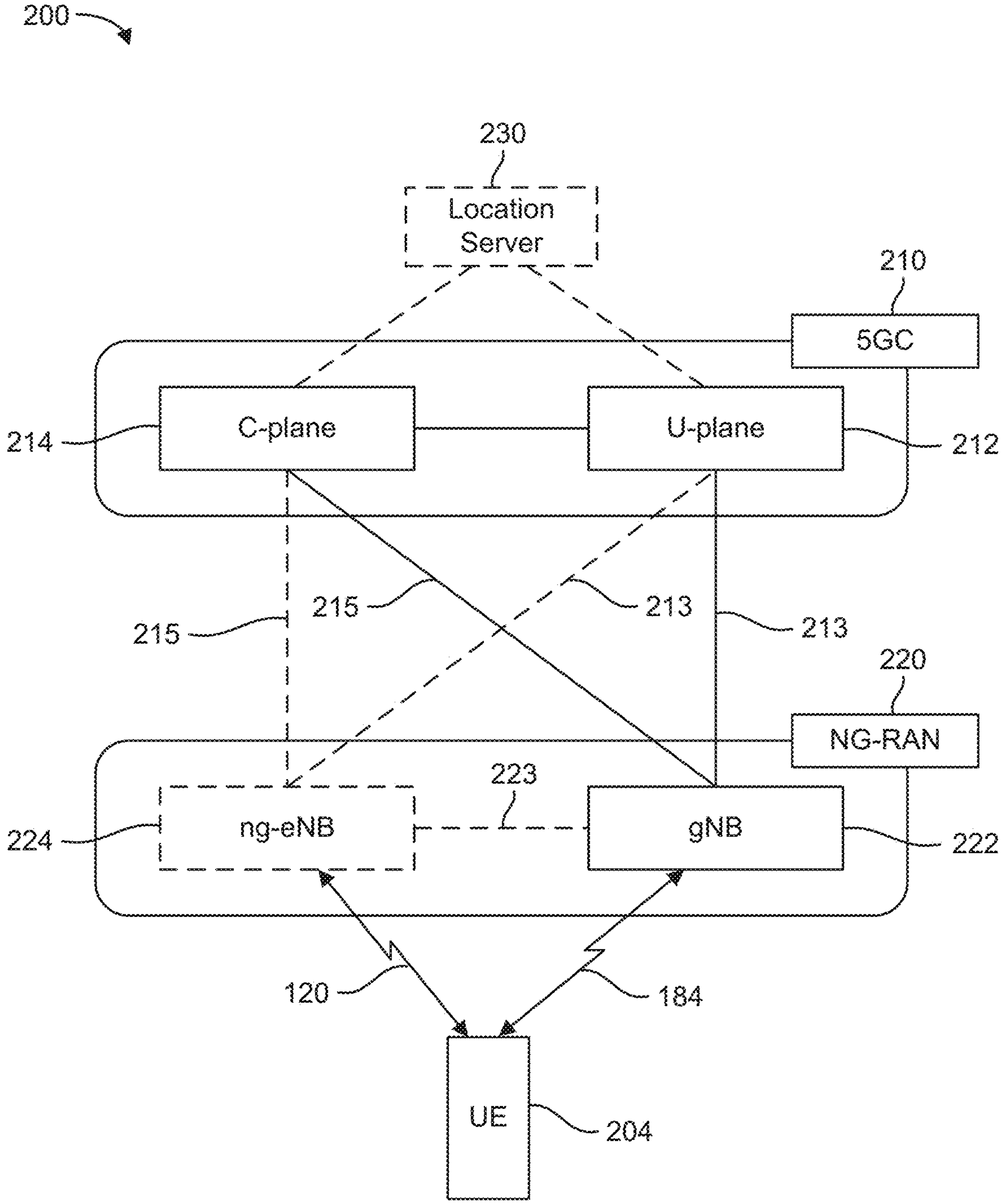
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
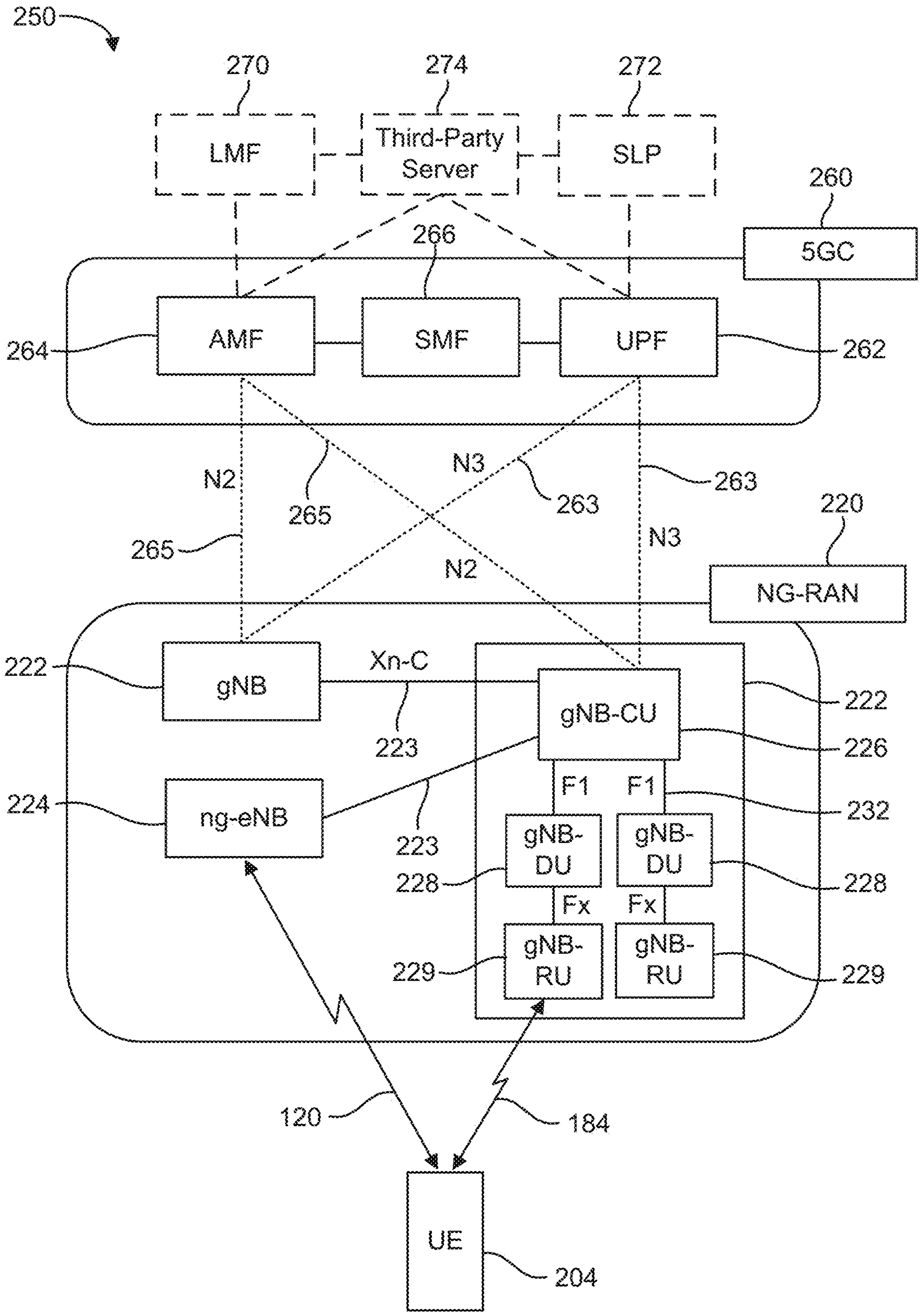

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QOS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Figure 3A:
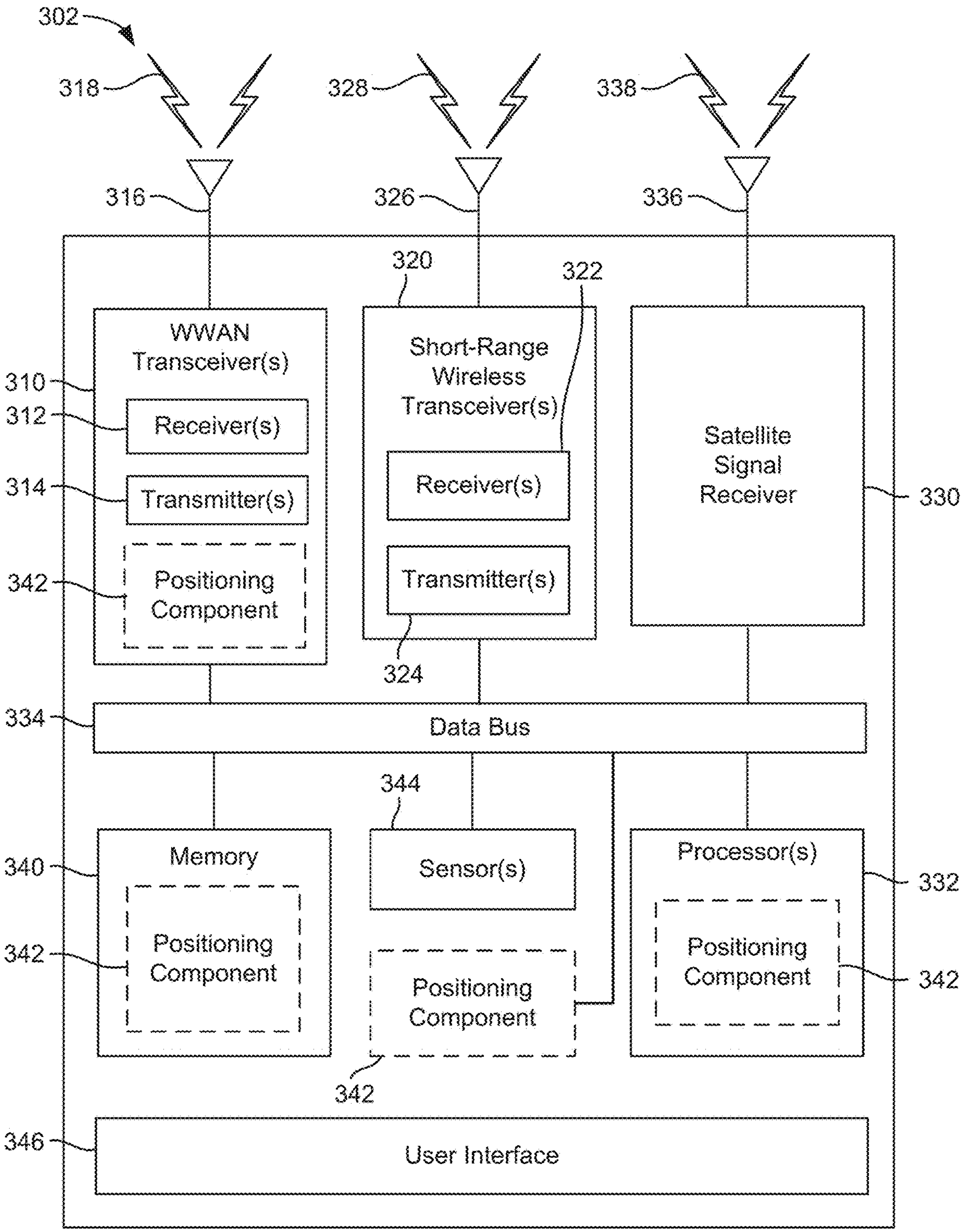
FIGS. 3A, 3B, and 3C are simplified block diagrams of several sample aspects of components that may be employed in a user equipment (UE), a base station, and a network entity, respectively, and configured to support communications as taught herein.
Figure 3B:
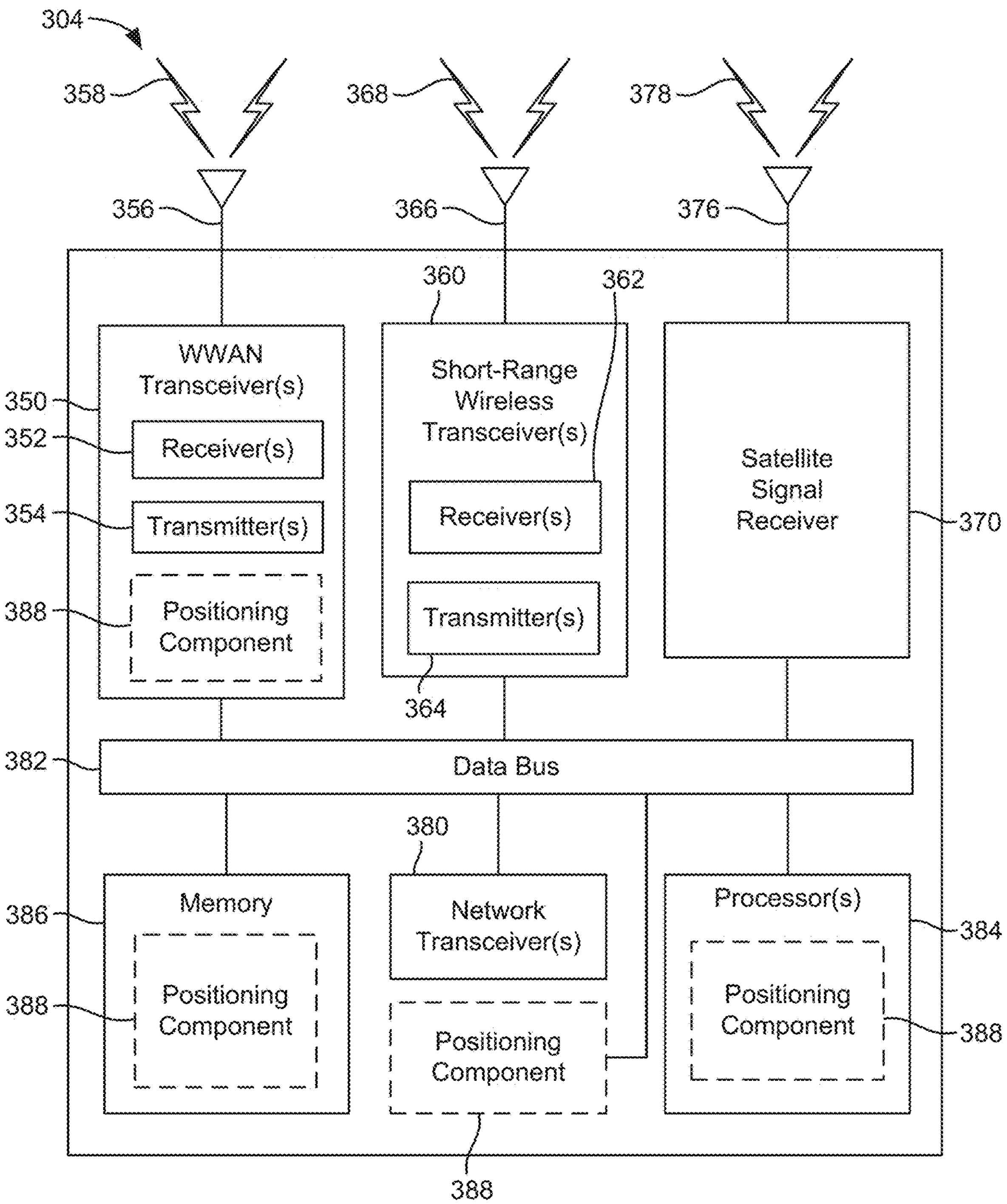
Figure 3C:
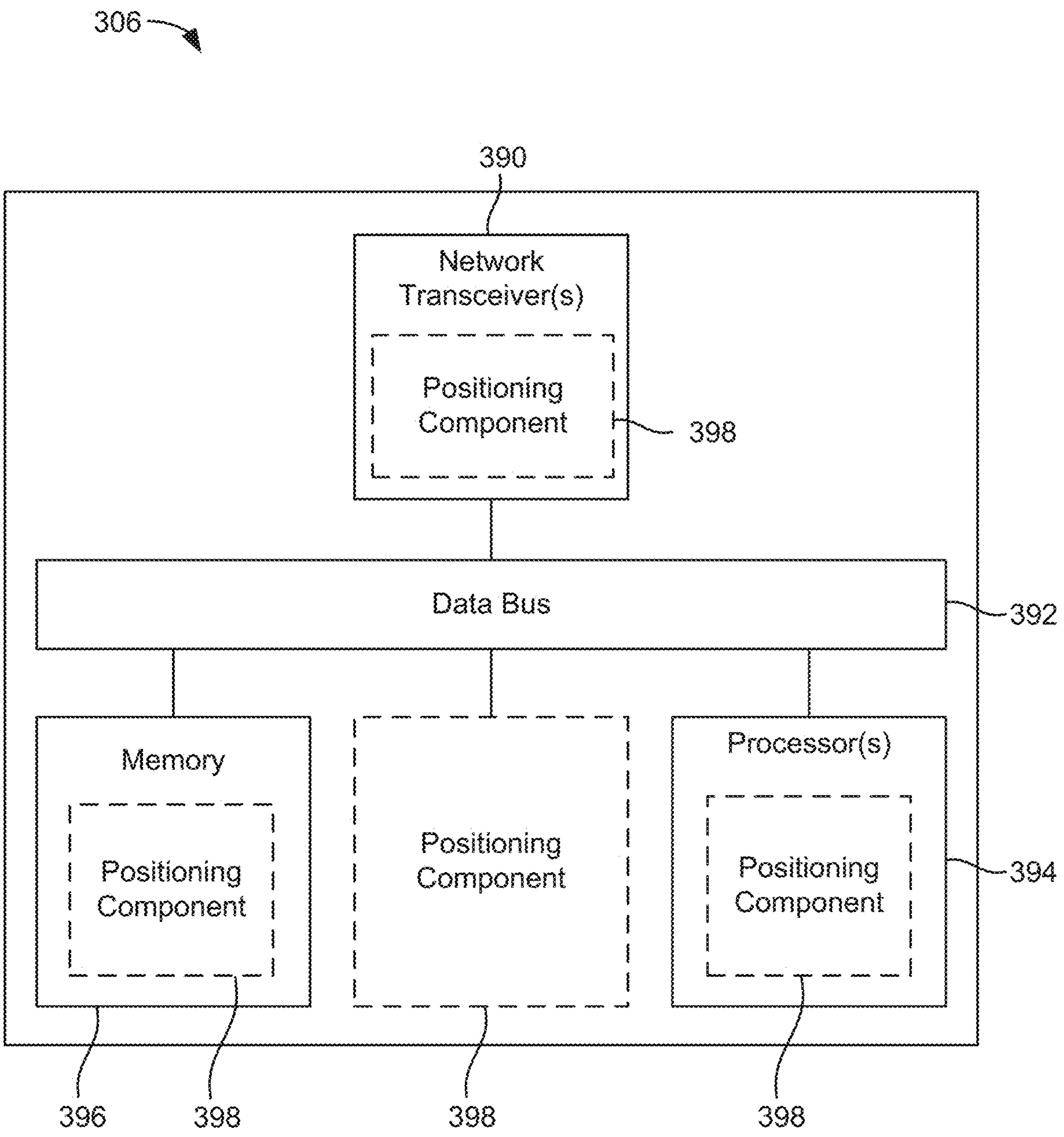

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions, Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4:
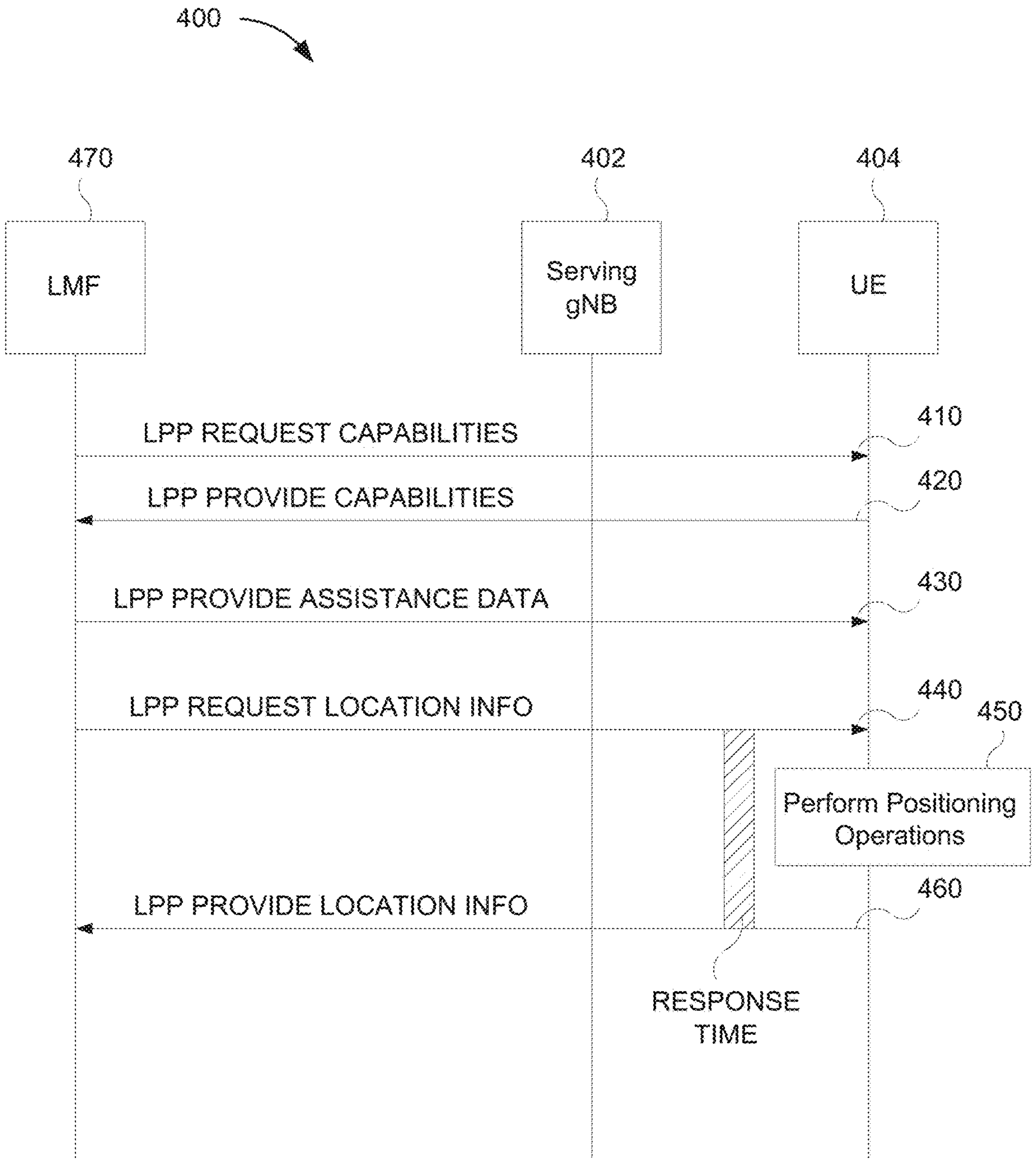
FIG. 4 illustrates an example Long-Term Evolution (LTE) positioning protocol (LPP) call flow between a UE and a location server for performing positioning operations.

FIG. 4 illustrates an example Long-Term Evolution (LTE) positioning protocol (LPP) procedure 400 between a UE 404 and a location server (illustrated as a location management function (LMF) 470) for performing positioning operations. As illustrated in FIG. 4, positioning of the UE 404 is supported via an exchange of LPP messages between the UE 404 and the LMF 470. The LPP messages may be exchanged between UE 404 and the LMF 470 via the UE's 404 serving base station (illustrated as a serving gNB 402) and a core network (not shown). The LPP procedure 400 may be used to position the UE 404 in order to support various location-related services, such as navigation for UE 404 (or for the user of UE 404), or for routing, or for provision of an accurate location to a public safety answering point (PSAP) in association with an emergency call from UE 404 to a PSAP, or for some other reason. The LPP procedure 400 may also be referred to as a positioning session, and there may be multiple positioning sessions for different types of positioning methods (e.g., downlink time difference of arrival (DL-TDOA), round-trip-time (RTT), enhanced cell identity (E-CID), etc.).

Initially, the UE 404 may receive a request for its positioning capabilities from the LMF 470 at stage 410 (e.g., an LPP Request Capabilities message). At stage 420, the UE 404 provides its positioning capabilities to the LMF 470 relative to the LPP protocol by sending an LPP Provide Capabilities message to LMF 470 indicating the position methods and features of these position methods that are supported by the UE 404 using LPP. The capabilities indicated in the LPP Provide Capabilities message may, in some aspects, indicate the type of positioning the UE 404 supports (e.g., DL-TDOA, RTT, E-CID, etc.) and may indicate the capabilities of the UE 404 to support those types of positioning.

Upon reception of the LPP Provide Capabilities message, at stage 420, the LMF 470 determines to use a particular type of positioning method (e.g., DL-TDOA, RTT, E-CID, etc.) based on the indicated type(s) of positioning the UE 404 supports and determines a set of one or more transmission-reception points (TRPs) from which the UE 404 is to measure downlink positioning reference signals or towards which the UE 404 is to transmit uplink positioning reference signals. At stage 430, the LMF 470 sends an LPP Provide Assistance Data message to the UE 404 identifying the set of TRPs.

In some implementations, the LPP Provide Assistance Data message at stage 430 may be sent by the LMF 470 to the UE 404 in response to an LPP Request Assistance Data message sent by the UE 404 to the LMF 470 (not shown in FIG. 4). An LPP Request Assistance Data message may include an identifier of the UE's 404 serving TRP and a request for the positioning reference signal (PRS) configuration of neighboring TRPs.

At stage 440, the LMF 470 sends a request for location information to the UE 404. The request may be an LPP Request Location Information message. This message usually includes information elements defining the location information type, desired accuracy of the location estimate, and response time (i.e., desired latency). Note that a low latency requirement allows for a longer response time while a high latency requirement requires a shorter response time. However, a long response time is referred to as high latency and a short response time is referred to as low latency.

Note that in some implementations, the LPP Provide Assistance Data message sent at stage 430 may be sent after the LPP Request Location Information message at 440 if, for example, the UE 404 sends a request for assistance data to LMF 470 (e.g., in an LPP Request Assistance Data message, not shown in FIG. 4) after receiving the request for location information at stage 440.

At stage 450, the UE 404 utilizes the assistance information received at stage 430 and any additional data (e.g., a desired location accuracy or a maximum response time) received at stage 440 to perform positioning operations (e.g., measurements of DL-PRS, transmission of UL-PRS, etc.) for the selected positioning method.

At stage 460, the UE 404 may send an LPP Provide Location Information message to the LMF 470 conveying the results of any measurements that were obtained at stage 450 (e.g., time of arrival (ToA), reference signal time difference (RSTD), reception-to-transmission (Rx-Tx), etc.) and before or when any maximum response time has expired (e.g., a maximum response time provided by the LMF 470 at stage 440). The LPP Provide Location Information message at stage 460 may also include the time (or times) at which the positioning measurements were obtained and the identity of the TRP(s) from which the positioning measurements were obtained. Note that the time between the request for location information at 440 and the response at 460 is the "response time" and indicates the latency of the positioning session.

The LMF 470 computes an estimated location of the UE 404 using the appropriate positioning techniques (e.g., DL-TDOA, RTT, E-CID, etc.) based, at least in part, on measurements received in the LPP Provide Location Information message at stage 460.

Figure 5:
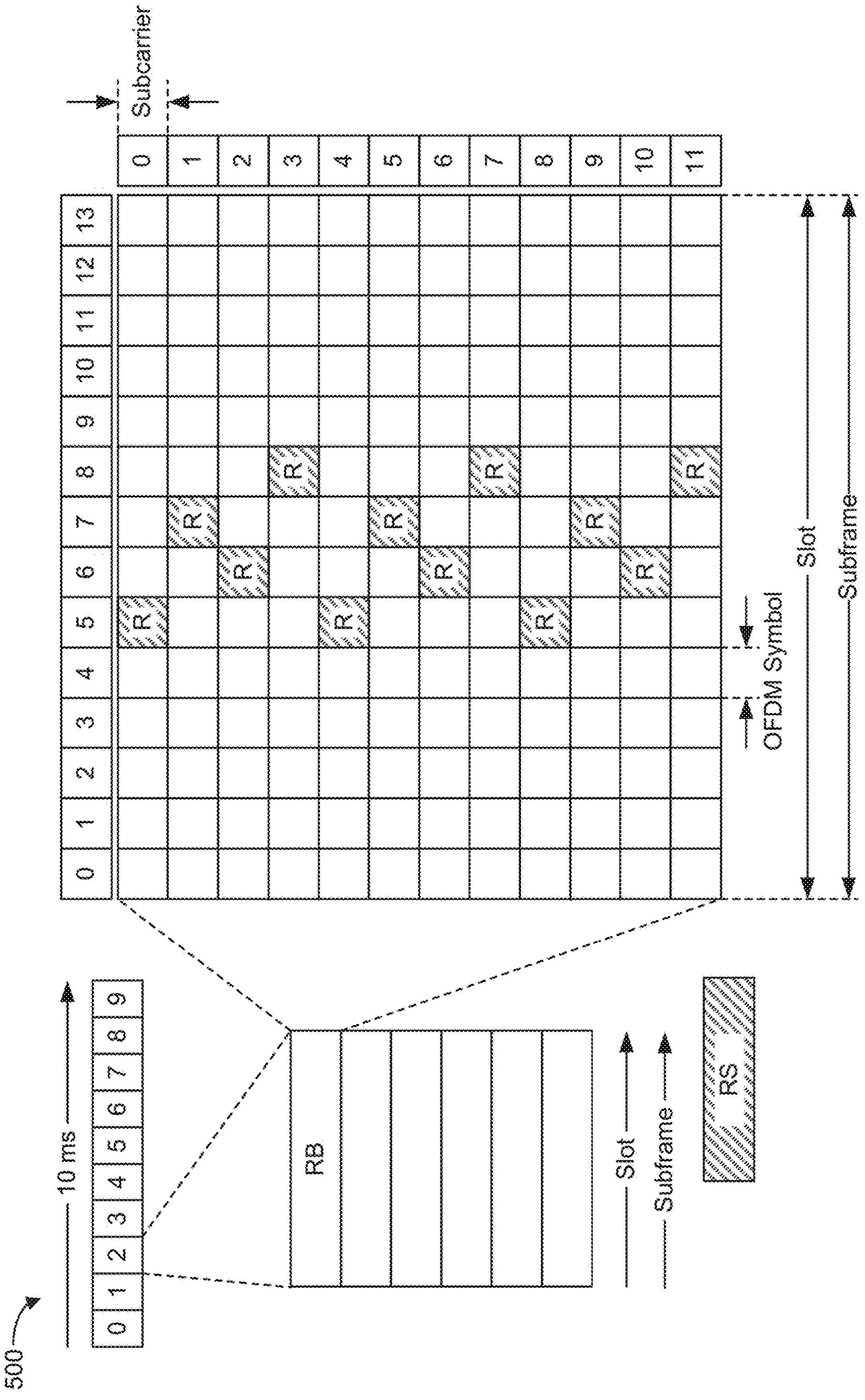
FIG. 5 is a diagram illustrating an example frame structure, according to aspects of the disclosure.

Various frame structures may be used to support downlink and uplink transmissions between network nodes (e.g., base stations and UEs). FIG. 5 is a diagram 500 illustrating an example frame structure, according to aspects of the disclosure. The frame structure may be a downlink or uplink frame structure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies (μ), for example, subcarrier spacings of 15 kHz (μ=0), 30 kHz (μ=1), 60 kHz (μ=2), 120 kHz (μ=3), and 240 kHz (μ=4) or greater may be available. In each subcarrier spacing, there are 14 symbols per slot. For 15 kHz SCS (μ=0), there is one slot per subframe, 10 slots per frame, the slot duration is 1 millisecond (ms), the symbol duration is 66.7 microseconds (μs), and the maximum nominal system bandwidth (in MHz) with a 4K FFT size is 50. For 30 kHz SCS (μ=1), there are two slots per subframe, 20 slots per frame, the slot duration is 0.5 ms, the symbol duration is 33.3 μs, and the maximum nominal system bandwidth (in MHz) with a 4K FFT size is 100. For 60 kHz SCS (μ=2), there are four slots per subframe, 40 slots per frame, the slot duration is 0.25 ms, the symbol duration is 16.7 μs, and the maximum nominal system bandwidth (in MHz) with a 4K FFT size is 200. For 120 kHz SCS (μ=3), there are eight slots per subframe, 80 slots per frame, the slot duration is 0.125 ms, the symbol duration is 8.33 μs, and the maximum nominal system bandwidth (in MHz) with a 4K FFT size is 400. For 240 kHz SCS (μ=4), there are 16 slots per subframe, 160 slots per frame, the slot duration is 0.0625 ms, the symbol duration is 4.17 μs, and the maximum nominal system bandwidth (in MHz) with a 4K FFT size is 800.

In the example of FIG. 5, a numerology of 15 kHz is used. Thus, in the time domain, a 10 ms frame is divided into 10 equally sized subframes of 1 ms each, and each subframe includes one time slot. In FIG. 5, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 5, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 5 illustrates example locations of REs carrying a reference signal (labeled "R"). A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 5 illustrates an example PRS resource configuration for comb-4 (which spans four symbols). That is, the locations of the shaded REs (labeled "R") indicate a comb-4 PRS resource configuration.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols. 2-symbol comb-2: {0, 1}; 4-symbol comb-2: {0, 1, 0, 1}; 6-symbol comb-2: {0, 1, 0, 1, 0, 1}; 12-symbol comb-2: {0, 1, 0, 1, 0, 1, 0, 1, 0, 1, 0, 1}; 4-symbol comb-4: {0, 2, 1, 3} (as in the example of FIG. 5): 12-symbol comb-4: {0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

A "PRS resource set" is a set of PRS resources used for the transmission of PRS signals, where each PRS resource has a PRS resource identifier (ID). In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from $2^\mu$*{4, 5, 8, 10, 16, 20, 32, 40, 64, 80, 160, 320, 640, 1280, 2560, 5120, 10240} slots, with $\mu$=0, 1, 2, 3. The repetition factor may have a length selected from {1, 2, 4, 6, 8, 16, 32} slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the physical downlink shared channel (PDSCH) are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. If needed to further distinguish the type of PRS, a downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

Figure 6:
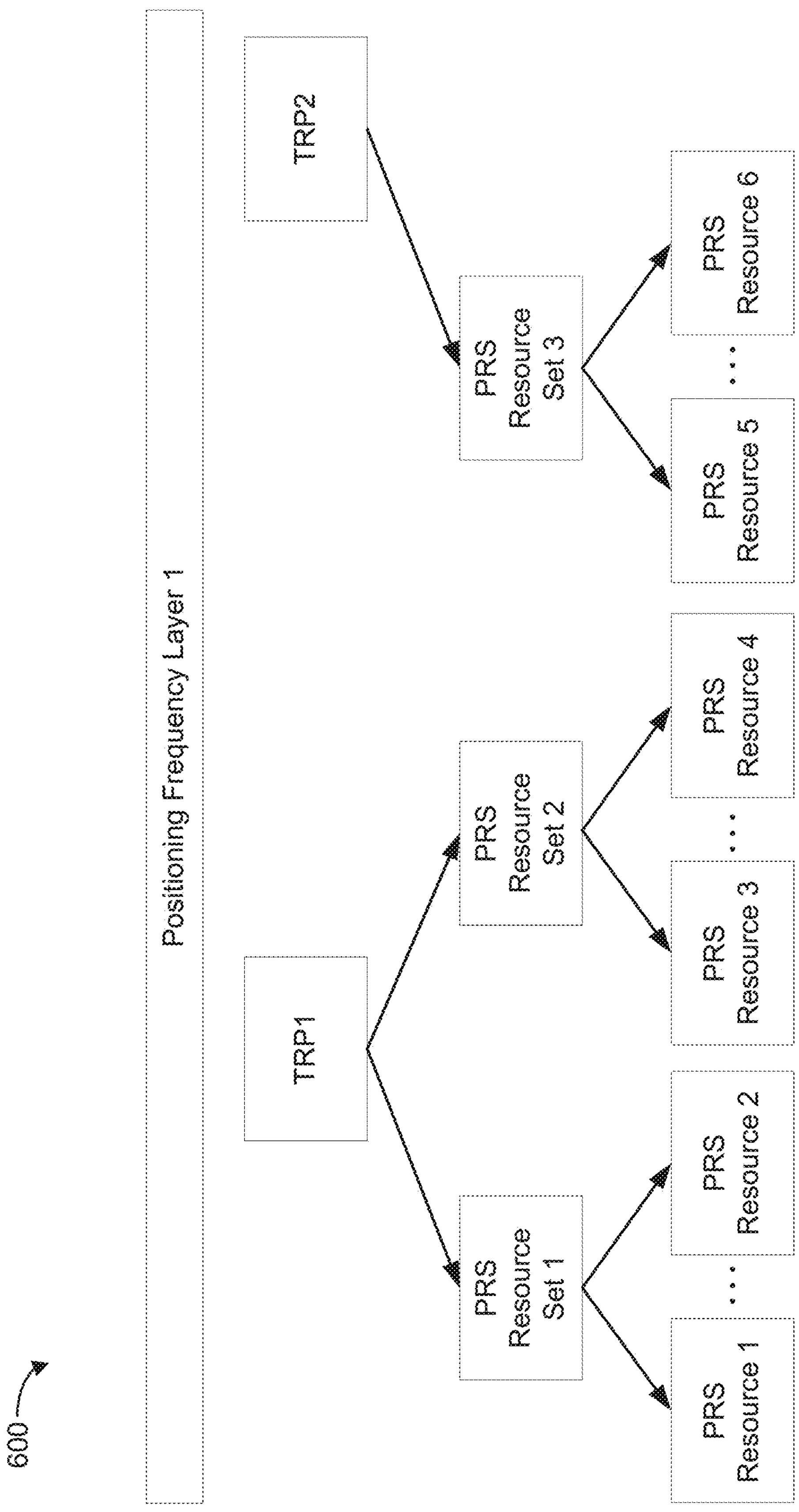
FIG. 6 is a diagram illustrating an example downlink positioning reference signal (DL-PRS) configuration for two transmission-reception points (TRPs) operating in the same positioning frequency layer, according to aspects of the disclosure.

FIG. 6 is a diagram 600 illustrating an example PRS configuration for two TRPs (labeled "TRP1" and "TRP2") operating in the same positioning frequency layer (labeled "Positioning Frequency Layer 1"), according to aspects of the disclosure. For a positioning session, a UE may be provided with assistance data indicating the illustrated PRS configuration. In the example of FIG. 6, the first TRP ("TRP1") is associated with (e.g., transmits) two PRS resource sets, labeled "PRS Resource Set 1" and "PRS Resource Set 2," and the second TRP ("TRP2") is associated with one PRS resource set, labeled "PRS Resource Set 3." Each PRS resource set comprises at least two PRS resources. Specifically, the first PRS resource set ("PRS Resource Set 1") includes PRS resources labeled "PRS Resource 1" and "PRS Resource 2," the second PRS resource set ("PRS Resource Set 2") includes PRS resources labeled "PRS Resource 3" and "PRS Resource 4," and the third PRS resource set ("PRS Resource Set 3") includes PRS resources labeled "PRS Resource 5" and "PRS Resource 6."

Figure 7:
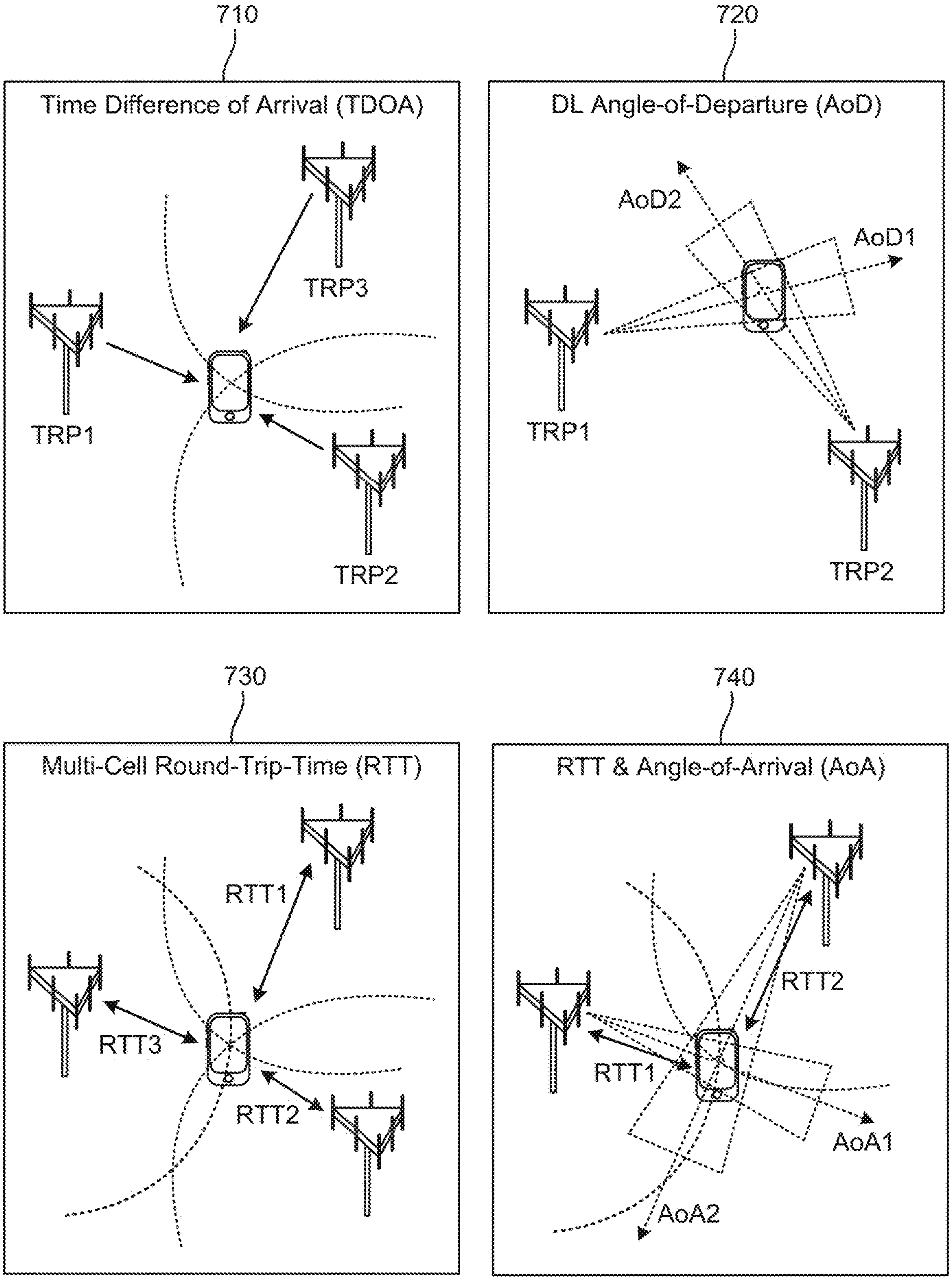
FIG. 7 illustrates examples of various positioning methods supported in New Radio (NR), according to aspects of the disclosure.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. FIG. 7 illustrates examples of various positioning methods, according to aspects of the disclosure. In an OTDOA or DL-TDOA positioning procedure, illustrated by scenario 710, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity (e.g., the UE for UE-based positioning or a location server for UE-assisted positioning) can estimate the UE's location.

For DL-AoD positioning, illustrated by scenario 720, the positioning entity uses a beam report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE. For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT" and "multi-RTT"). In an RTT procedure, a first entity (e.g., a base station or a UE) transmits a first RTT-related signal (e.g., a PRS or SRS) to a second entity (e.g., a UE or base station), which transmits a second RTT-related signal (e.g., an SRS or PRS) back to the first entity. Each entity measures the time difference between the time of arrival (ToA) of the received RTT-related signal and the transmission time of the transmitted RTT-related signal. This time difference is referred to as a reception-to-transmission (Rx-Tx) time difference. The Rx-Tx time difference measurement may be made, or may be adjusted, to include only a time difference between nearest subframe boundaries for the received and transmitted signals. Both entities may then send their Rx-Tx time difference measurement to a location server (e.g., an LMF 270), which calculates the round trip propagation time (i.e., RTT) between the two entities from the two Rx-Tx time difference measurements (e.g., as the sum of the two Rx-Tx time difference measurements). Alternatively, one entity may send its Rx-Tx time difference measurement to the other entity, which then calculates the RTT. The distance between the two entities can be determined from the RTT and the known signal speed (e.g., the speed of light). For multi-RTT positioning, illustrated by scenario 730, a first entity (e.g., a UE or base station) performs an RTT positioning procedure with multiple second entities (e.g., multiple base stations or UEs) to enable the location of the first entity to be determined (e.g., using multilateration) based on distances to, and the known locations of, the second entities. RTT and multi-RTT methods can be combined with other positioning techniques, such as UL-AoA and DL-AoD, to improve location accuracy, as illustrated by scenario 740.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 8:
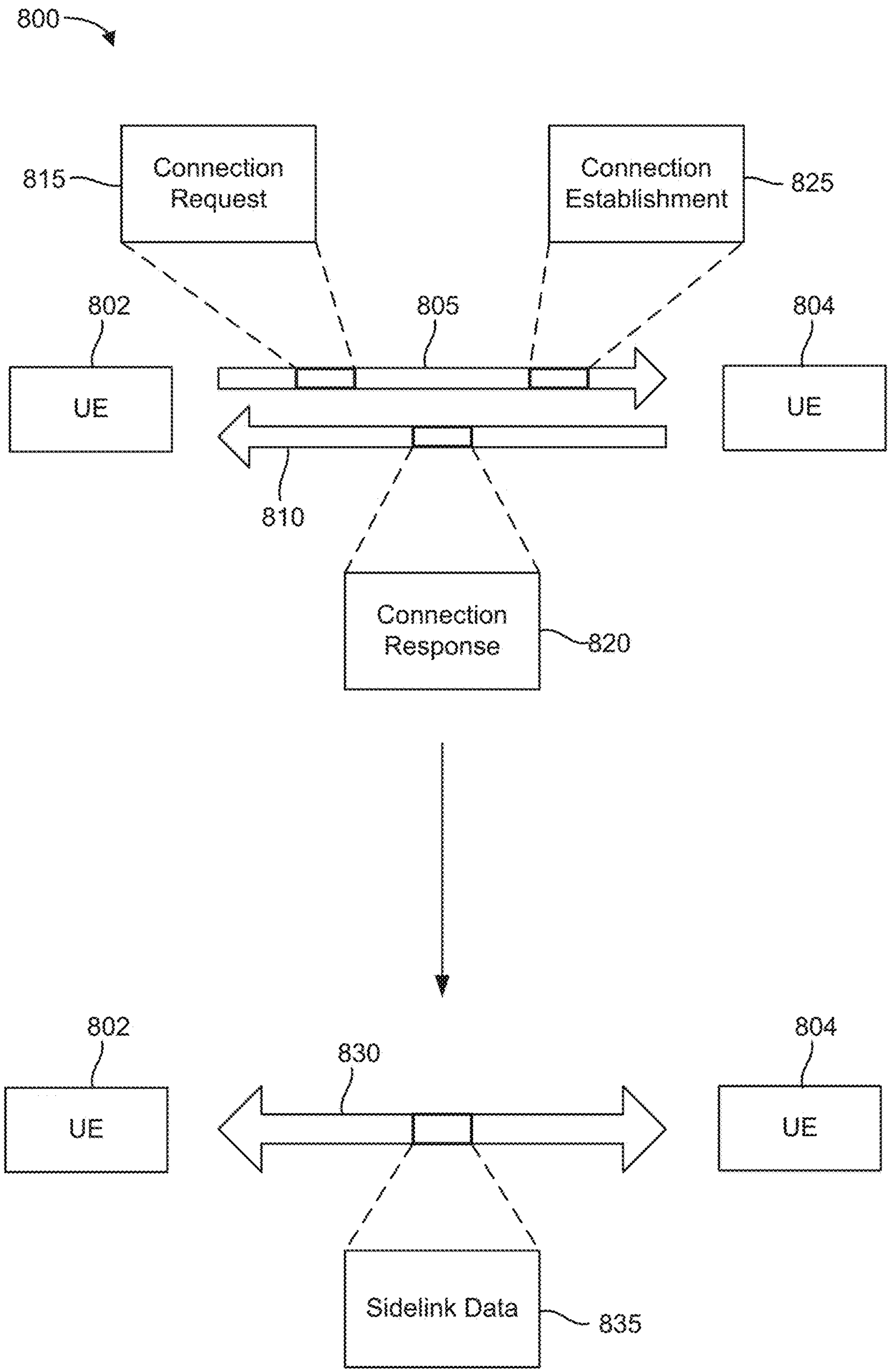
FIG. 8 illustrates an example of a wireless communications system that supports unicast sidelink establishment, according to aspects of the disclosure.

FIG. 8 illustrates an example of a wireless communications system 800 that supports wireless unicast sidelink establishment, according to aspects of the disclosure. In some examples, wireless communications system 800 may implement aspects of wireless communications systems 100, 200, and 250. Wireless communications system 800 may include a first UE 802 and a second UE 804, which may be examples of any of the UEs described herein. As specific examples, UEs 802 and 804 may correspond to V-UEs 160 in FIG. 1.

In the example of FIG. 8, the UE 802 may attempt to establish a unicast connection over a sidelink with the UE 804, which may be a V2X sidelink between the UE 802 and UE 804. As specific examples, the established sidelink connection may correspond to sidelinks 162 and/or 168 in FIG. 1. The sidelink connection may be established in an omni-directional frequency range (e.g., FR1) and/or a mmW frequency range (e.g., FR2). In some cases, the UE 802 may be referred to as an initiating UE that initiates the sidelink connection procedure, and the UE 804 may be referred to as a target UE that is targeted for the sidelink connection procedure by the initiating UE.

For establishing the unicast connection, access stratum (AS) (a functional layer in the UMTS and LTE protocol stacks between the RAN and the UE that is responsible for transporting data over wireless links and managing radio resources, and which is part of Layer 2) parameters may be configured and negotiated between the UE 802 and UE 804. For example, a transmission and reception capability matching may be negotiated between the UE 802 and UE 804. Each UE may have different capabilities (e.g., transmission and reception, 64 quadrature amplitude modulation (QAM), transmission diversity, carrier aggregation (CA), supported communications frequency band(s), etc.). In some cases, different services may be supported at the upper layers of corresponding protocol stacks for UE 802 and UE 804. Additionally, a security association may be established between UE 802 and UE 804 for the unicast connection. Unicast traffic may benefit from security protection at a link level (e.g., integrity protection). Security requirements may differ for different wireless communications systems. For example, V2X and Uu systems may have different security requirements (e.g., Uu security does not include confidentiality protection). Additionally, IP configurations (e.g., IP versions, addresses, etc.) may be negotiated for the unicast connection between UE 802 and UE 804.

In some cases, UE 804 may create a service announcement (e.g., a service capability message) to transmit over a cellular network (e.g., cV2X) to assist the sidelink connection establishment. Conventionally, UE 802 may identify and locate candidates for sidelink communications based on a basic service message (BSM) broadcasted unencrypted by nearby UEs (e.g., UE 804). The BSM may include location information, security and identity information, and vehicle information (e.g., speed, maneuver, size, etc.) for the corresponding UE. However, for different wireless communications systems (e.g., D2D or V2X communications), a discovery channel may not be configured so that UE 802 is able to detect the BSM(s). Accordingly, the service announcement transmitted by UE 804 and other nearby UEs (e.g., a discovery signal) may be an upper layer signal and broadcasted (e.g., in an NR sidelink broadcast). In some cases, the UE 804 may include one or more parameters for itself in the service announcement, including connection parameters and/or capabilities it possesses. The UE 802 may then monitor for and receive the broadcasted service announcement to identify potential UEs for corresponding sidelink connections. In some cases, the UE 802 may identify the potential UEs based on the capabilities each UE indicates in their respective service announcements.

The service announcement may include information to assist the UE 802 (e.g., or any initiating UE) to identify the UE transmitting the service announcement (UE 804 in the example of FIG. 8). For example, the service announcement may include channel information where direct communication requests may be sent. In some cases, the channel information may be RAT-specific (e.g., specific to LTE or NR) and may include a resource pool within which UE 802 transmits the communication request. Additionally, the service announcement may include a specific destination address for the UE (e.g., a Layer 2 destination address) if the destination address is different from the current address (e.g., the address of the streaming provider or UE transmitting the service announcement). The service announcement may also include a network or transport layer for the UE 802 to transmit a communication request on. For example, the network layer (also referred to as "Layer 3" or "L3") or the transport layer (also referred to as "Layer 4" or "L4") may indicate a port number of an application for the UE transmitting the service announcement. In some cases, no IP addressing may be needed if the signaling (e.g., PC5 signaling) carries a protocol (e.g., a real-time transport protocol (RTP)) directly or gives a locally-generated random protocol. Additionally, the service announcement may include a type of protocol for credential establishment and QoS-related parameters.

After identifying a potential sidelink connection target (UE 804 in the example of FIG. 8), the initiating UE (UE 802 in the example of FIG. 8) may transmit a connection request 815 to the identified target UE 804. In some cases, the connection request 815 may be a first RRC message transmitted by the UE 802 to request a unicast connection with the UE 804 (e.g., an "RRCSetupRequest" message). For example, the unicast connection may utilize the PC5 interface for the sidelink, and the connection request 815 may be an RRC connection setup request message. Additionally, the UE 802 may use a sidelink signaling radio bearer 805 to transport the connection request 815.

After receiving the connection request 815, the UE 804 may determine whether to accept or reject the connection request 815. The UE 804 may base this determination on a transmission/reception capability, an ability to accommodate the unicast connection over the sidelink, a particular service indicated for the unicast connection, the contents to be transmitted over the unicast connection, or a combination thereof. For example, if the UE 802 wants to use a first RAT to transmit or receive data, but the UE 804 does not support the first RAT, then the UE 804 may reject the connection request 815. Additionally or alternatively, the UE 804 may reject the connection request 815 based on being unable to accommodate the unicast connection over the sidelink due to limited radio resources, a scheduling issue, etc. Accordingly, the UE 804 may transmit an indication of whether the request is accepted or rejected in a connection response 820. Similar to the UE 802 and the connection request 815, the UE 804 may use a sidelink signaling radio bearer 810 to transport the connection response 820. Additionally, the connection response 820 may be a second RRC message transmitted by the UE 804 in response to the connection request 815 (e.g., an "RRCResponse" message).

In some cases, sidelink signaling radio bearers 805 and 810 may be the same sidelink signaling radio bearer or may be separate sidelink signaling radio bearers. Accordingly, a radio link control (RLC) layer acknowledged mode (AM) may be used for sidelink signaling radio bearers 805 and 810. A UE that supports the unicast connection may listen on a logical channel associated with the sidelink signaling radio bearers. In some cases, the AS layer (i.e., Layer 2) may pass information directly through RRC signaling (e.g., control plane) instead of a V2X layer (e.g., data plane).

If the connection response 820 indicates that the UE 804 accepted the connection request 815, the UE 802 may then transmit a connection establishment 825 message on the sidelink signaling radio bearer 805 to indicate that the unicast connection setup is complete. In some cases, the connection establishment 825 may be a third RRC message (e.g., an "RRCSetupComplete" message). Each of the connection request 815, the connection response 820, and the connection establishment 825 may use a basic capability when being transported from one UE to the other UE to enable each UE to be able to receive and decode the corresponding transmission (e.g., the RRC messages).

Additionally, identifiers may be used for each of the connection request 815, the connection response 820, and the connection establishment 825. For example, the identifiers may indicate which UE 802/804 is transmitting which message and/or for which UE 802/804 the message is intended. For physical (PHY) layer channels, the RRC signaling and any subsequent data transmissions may use the same identifier (e.g., Layer 2 IDs). However, for logical channels, the identifiers may be separate for the RRC signaling and for the data transmissions. For example, on the logical channels, the RRC signaling and the data transmissions may be treated differently and have different acknowledgement (ACK) feedback messaging. In some cases, for the RRC messaging, a physical layer ACK may be used for ensuring the corresponding messages are transmitted and received properly.

One or more information elements may be included in the connection request 815 and/or the connection response 820 for UE 802 and/or UE 804, respectively, to enable negotiation of corresponding AS layer parameters for the unicast connection. For example, the UE 802 and/or UE 804 may include packet data convergence protocol (PDCP) parameters in a corresponding unicast connection setup message to set a PDCP context for the unicast connection. In some cases, the PDCP context may indicate whether or not PDCP duplication is utilized for the unicast connection. Additionally, the UE 802 and/or UE 804 may include RLC parameters when establishing the unicast connection to set an RLC context for the unicast connection. For example, the RLC context may indicate whether an AM (e.g., a reordering timer (t-reordering) is used) or an unacknowledged mode (UM) is used for the RLC layer of the unicast communications.

Additionally, the UE 802 and/or UE 804 may include medium access control (MAC) parameters to set a MAC context for the unicast connection. In some cases, the MAC context may enable resource selection algorithms, a hybrid automatic repeat request (HARQ) feedback scheme (e.g., ACK or negative ACK (NACK) feedback), parameters for the HARQ feedback scheme, carrier aggregation, or a combination thereof for the unicast connection. Additionally, the UE 802 and/or UE 804 may include PHY layer parameters when establishing the unicast connection to set a PHY layer context for the unicast connection. For example, the PHY layer context may indicate a transmission format (unless transmission profiles are included for each UE 802/804) and a radio resource configuration (e.g., bandwidth part (BWP), numerology, etc.) for the unicast connection. These information elements may be supported for different frequency range configurations (e.g., FR1 and FR2).

In some cases, a security context may also be set for the unicast connection (e.g., after the connection establishment 825 message is transmitted). Before a security association (e.g., security context) is established between the UE 802 and UE 804, the sidelink signaling radio bearers 805 and 810 may not be protected. After a security association is established, the sidelink signaling radio bearers 805 and 810 may be protected. Accordingly, the security context may enable secure data transmissions over the unicast connection and the sidelink signaling radio bearers 805 and 810. Additionally, IP layer parameters (e.g., link-local IPv4 or IPv6 addresses) may also be negotiated. In some cases, the IP layer parameters may be negotiated by an upper layer control protocol running after RRC signaling is established (e.g., the unicast connection is established). As noted above, the UE 804 may base its decision on whether to accept or reject the connection request 815 on a particular service indicated for the unicast connection and/or the contents to be transmitted over the unicast connection (e.g., upper layer information). The particular service and/or contents may be also indicated by an upper layer control protocol running after RRC signaling is established.

After the unicast connection is established, the UE 802 and UE 804 may communicate using the unicast connection over a sidelink 830, where sidelink data 835 is transmitted between the two UEs 802 and 804. The sidelink 830 may correspond to sidelinks 162 and/or 168 in FIG. 1. In some cases, the sidelink data 835 may include RRC messages transmitted between the two UEs 802 and 804. To maintain this unicast connection on sidelink 830. UE 802 and/or UE 804 may transmit a keep alive message (e.g., "RRCLinkAlive" message, a fourth RRC message, etc.). In some cases, the keep alive message may be triggered periodically or on-demand (e.g., event-triggered). Accordingly, the triggering and transmission of the keep alive message may be invoked by UE 802 or by both UE 802 and UE 804. Additionally, or alternatively, a MAC control element (CE) (e.g., defined over sidelink 830) may be used to monitor the status of the unicast connection on sidelink 830 and maintain the connection. When the unicast connection is no longer needed (e.g., UE 802 travels far enough away from UE 804), either UE 802 and/or UE 804 may start a release procedure to drop the unicast connection over sidelink 830. Accordingly, subsequent RRC messages may not be transmitted between UE 802 and UE 804 on the unicast connection.

Conventional positioning measurement reports have been from the UE to the gNB/LMF for DL methods and gNBs to the LMF for UL methods. In mixed methods, such as RTT, measurement reports are transmitted from both the gNB and the UE to the LMF. In general, there is no feedback provided to the gNB/UE about the quality/usefulness of the measurements received at the LMF. The UE may prune data after performing the measurements, but the UE must consume power to initially perform the measurements.

In accordance with certain aspects of the disclosure, a UE may receive post-measurement positioning assistance data (AD) from one or more sidelink devices that have already measured PRS resources in connection with their own positioning sessions. The UE may use the post-measurement positioning AD to optimize its PRS resource measurement strategy during a positioning session between the UE and the LMF.

Figure 9:
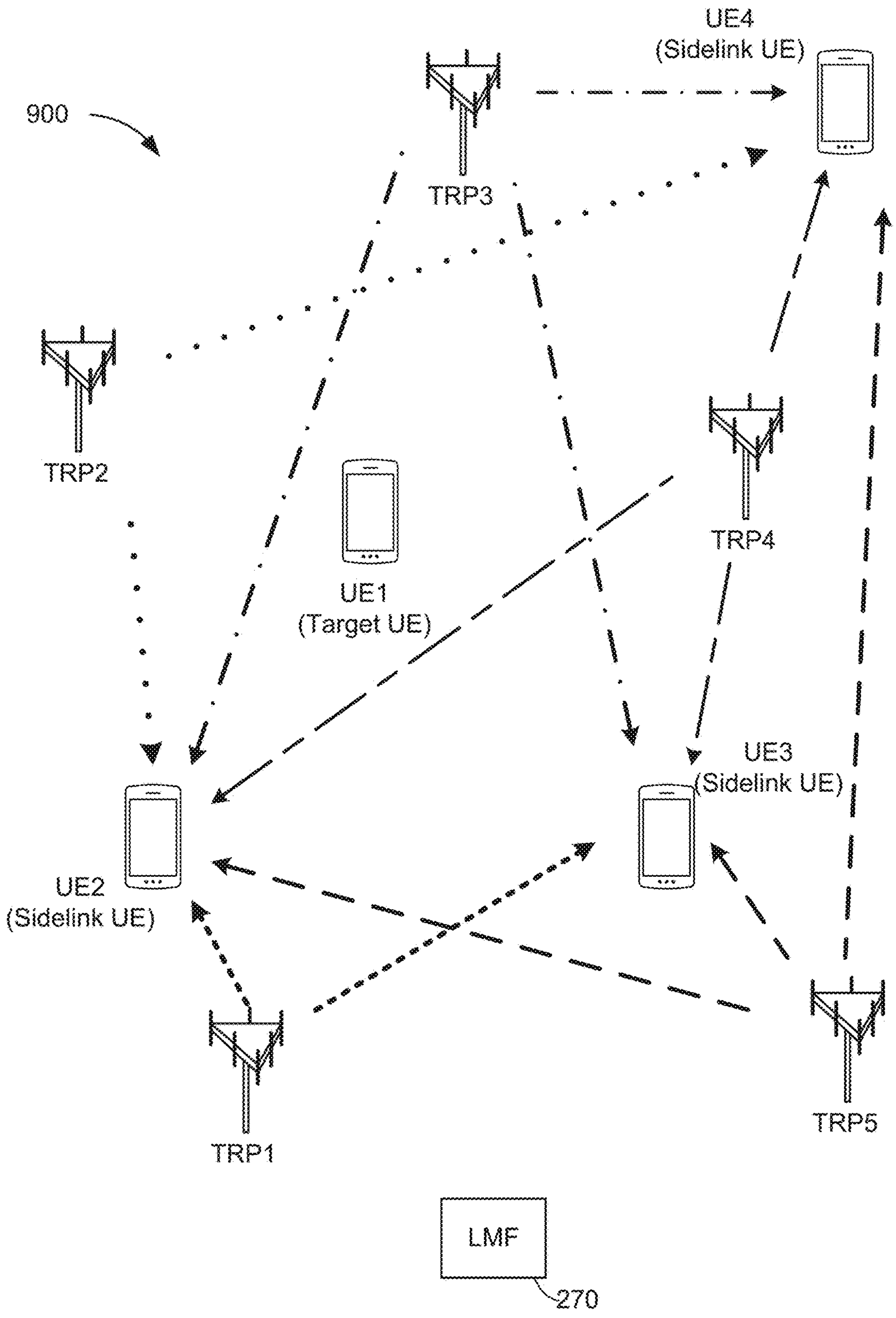
FIG. 9 is a diagram showing an example environment in which certain aspects of the disclosure may be implemented.

FIG. 9 is a diagram showing an example positioning environment 900 in which certain aspects of the disclosed system may be implemented. The example positioning environment 900 includes a target UE, labeled "UE1," and multiple sidelink UEs, labeled "UE2," "UE3," and "UE4" (collectively "sidelink UEs"). As described herein, each sidelink UE will measure one or more PRS resources in the example positioning environment 900 and subsequently make all or a portion of the measurements available as post-measurement positioning AD to target UE1. Example positioning environment 900 also includes multiple TRPs, labeled "TRP1," "TRP2," "TRP3," "TRP4," and "TRP5," each of which may transmit one or more PRS resources that are measured by the sidelink UEs and the target UE1.

FIG. 9 shows the sidelink UEs engaged in respective positioning sessions with LMF 270 in accordance with certain aspects of the disclosure. In this example, LMF 270 is associated with TRP1 through TRP5, although it may be associated with additional TRPs, fewer TRPs, or one or more different TRPs/base stations in the example positioning environment 900. Pursuant to the positioning sessions with the sidelink UEs, the LMF 270 may provide positioning assistance data (AD) to each sidelink UE indicating PRS resources that are to be measured during the respective positioning session. Here, sidelink UE2 measures at least one PRS resource from each of TRP1, TRP2. TRP3, TRP4, and TRP5, and reports its measurements to LMF 270 during UE2's positioning session. Sidelink UE3 measures at least one PRS resource from each of TRP1, TRP3, TRP4, and TRP5, and reports its measurements to LMF 270 during UE3's positioning session. Sidelink UE4 measures at least one PRS resource from each of TRP2, TRP3. TRP4, and TRP5, and reports its measurements to LMF 270 during UE4's positioning session. Each of the sidelink UEs may retain at least some measurements of the PRS resources that it makes for subsequent availability as post-measurement positioning AD to other UEs in the example positioning environment 900. For purposes of the following examples, only transactions associated with post-measurement positioning AD with target UE1 are described. However, based on the teachings of the present disclosure, it will be recognized that the operations described herein may be extended to one or more other UEs located in the example positioning environment 900.

Figure 10:
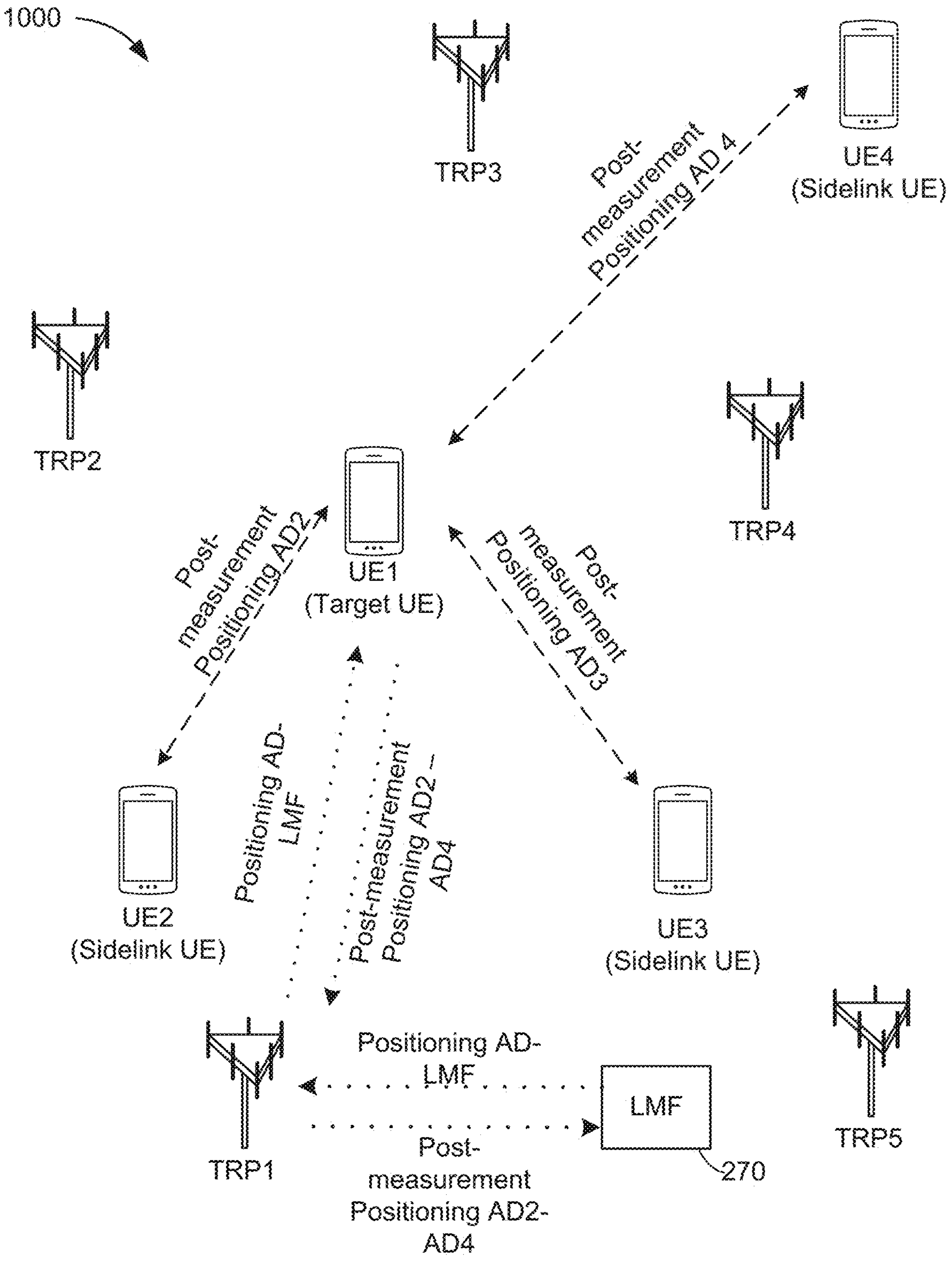
FIG. 10 is a diagram of an example positioning environment showing operations that may be executed accordance with certain aspects of the disclosure.

FIG. 10 illustrates an example positioning environment 1000 in which the target UE1 initiates a positioning session in accordance with certain aspects of the disclosure. The layouts of the elements (target UE, sidelink UEs. TRPs, etc.) in the positioning environment 1000 are merely examples and are not meant to convey any scale of the distances between the elements or any particular geographical layout. In this example, the sidelink UEs have already performed some measurements of PRS resources during one or more prior positioning sessions between the LMF 270 and the respective sidelink UEs. In accordance with certain aspects of the disclosure, if a sidelink UE is within a threshold distance of target UE1, it is assumed that the quality of measurements experienced by the sidelink UE would be substantially similar to that experienced by target UE1. For example, if a PRS resource is LOS for a sidelink UE within a threshold distance of target UE1, it is likely that the same PRS resource is also LOS for the target UE1. In certain aspects, similar inferences can be made on link quality and other metrics (e.g., RSRP, etc.). Further, in accordance with certain aspects of the disclosure, the PRS resource measurements made by sidelink UEs within the threshold distance might be helpful to the target UE1 for cross-validation purposes. For example, if RSTD measurements of one or more PRS resources at target UE1 are very different than the RSTD measurements of the same PRS resources made at another sidelink UE, then target UE1 may choose to ignore measurements of those PRS resources. Additionally, or alternatively, target UE1 may choose to ignore post-measurement positioning AD received from other sidelink UEs with the disparate measurements. Post-measurement positioning AD from a sidelink UE within the threshold distance may be used by target UE1 to determine measurement quality metric information associated with the PRS resources in the example positioning environment 1000 thereby allowing target UE1 to prioritize measurements of PRS resources having a high perceived quality. Such prioritization can be used to improve power and resource consumption, and improve measurement and reporting latency.

In the example of FIG. 10, target UE1 has engaged the LMF 270 in a positioning session. Pursuant to the positioning session, target UE1 transmits a need for post-measurement positioning AD to the sidelink UEs in the example positioning environment 1000 over one or more sidelink channels. In certain aspects, the transmission may be in the form of requests for post-measurement positioning AD from specific sidelink UEs within a threshold distance of target UE1 as determined by one or more distance criteria. In such instances, target UE1 determines which of the sidelink UEs are within the threshold distance. Additionally, or alternatively, the transmission from UE1 may be in the form of a general groupcast of a request to all sidelink UEs in the example positioning environment 1000, where only sidelink UEs within the threshold distance of target UE1 respond to the request. In such instances, each sidelink UE determines whether it is within the distance threshold based on the distance criterion.

In accordance with various aspects of the disclosure, the distance criterion may be based on sidelink reference signal measurements. In an aspect, target UE1 measures the signal strength of one or more sidelink reference signals received from each of the sidelink UEs in the example positioning environment 1000. In accordance with certain aspects, only sidelink UEs having RSRP measurements at target UE1 greater than a threshold may be considered within the threshold distance since such RSRP measurements may be assumed to correlate with the distance between target UE1 and each of the sidelink UEs. Additionally, or alternatively, each sidelink UE may measure the signal strength of one or more sidelink reference signals received from target UE1. In accordance with certain aspects, only sidelink UEs measuring RSRP of reference signals received from target UE1 greater than a threshold may consider themselves within the threshold distance since such RSRP measurements may be assumed to correlate with the distance between target UE1 and each of the sidelink UEs.

Figure 11:
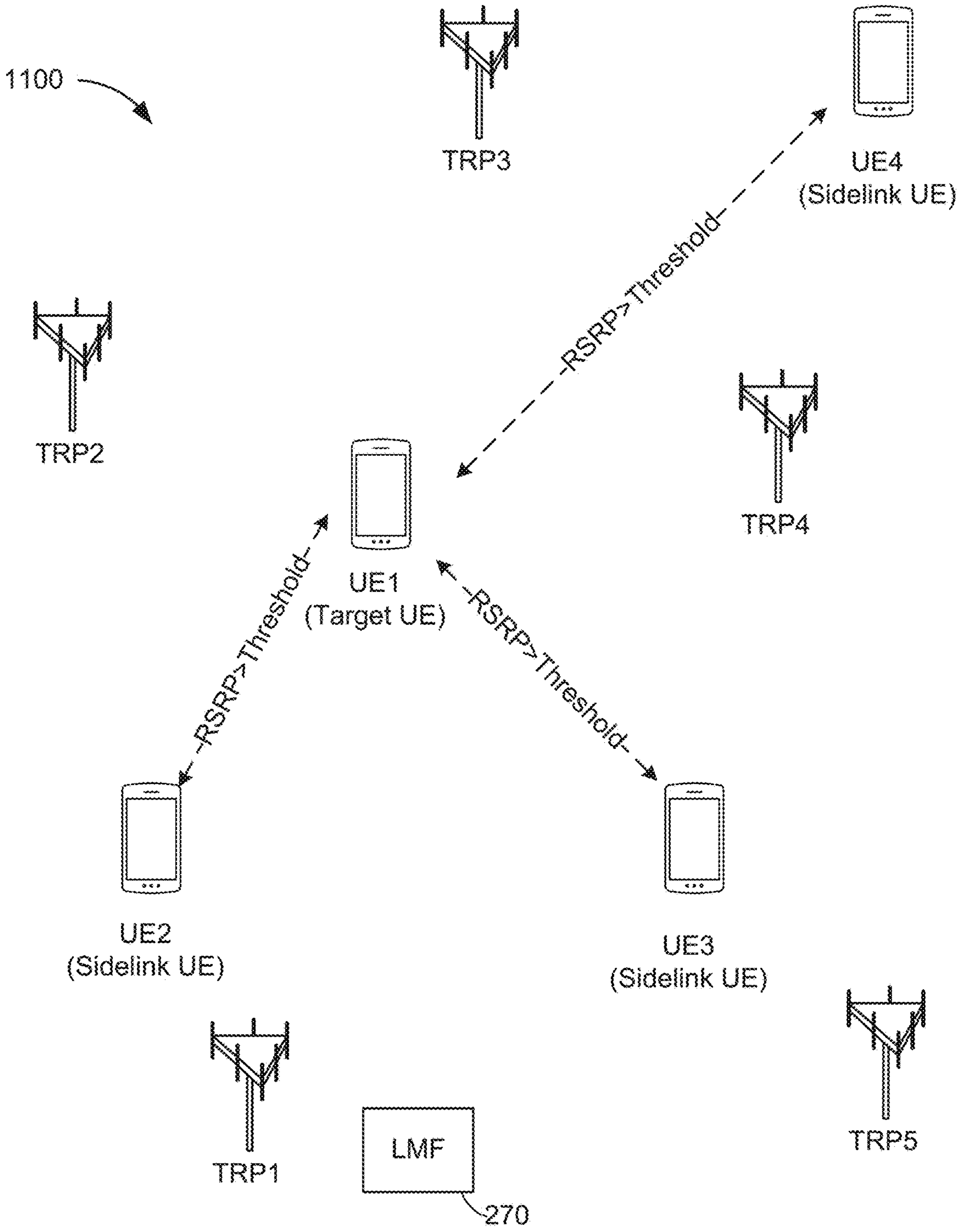
FIG. 11 is a diagram showing an example of determining a threshold distance in accordance with certain aspects of the disclosure.

FIG. 11 shows an example positioning environment 1100 in which RSRP measurements made by target UE1 are used to determine whether a sidelink UE is within the threshold distance. As shown, FIG. 11 includes the same sidelink UEs (UE2, UE3, and UE4) and target UE1 depicted in FIG. 10. In this example, target UE1 makes RSRP measurements of sidelink reference signals from each of the sidelink UEs and compares the RSRP measurements with a threshold. Here, all of the sidelink UEs in example positioning environment 1100 are shown as having RSRP measurements at target UE1 that are greater than the RSRP threshold. Consequently, all of the sidelink UEs are considered within the threshold distance of target UE1 and may be used to provide post-measurement positioning AD.

Figure 12:
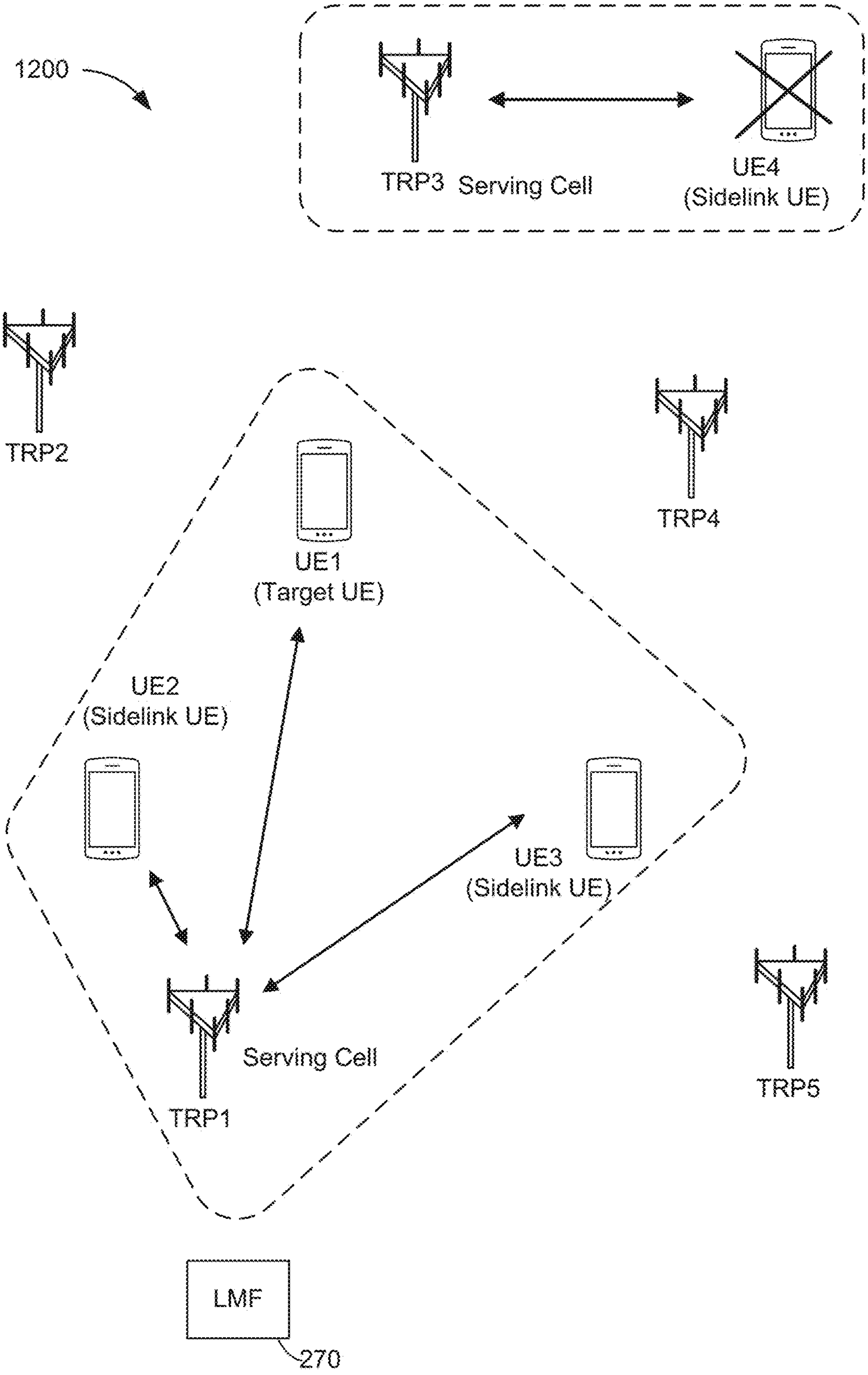
FIG. 12 is a diagram showing another example of determining a threshold distance in accordance with certain aspects of the disclosure.

In certain aspects, whether a sidelink UE is within the threshold distance of target UE1 may be based on whether the sidelink UE is associated with the same serving cell as target UE1. An example of the application of serving cell criterion as a basis for threshold distance determination is shown in connection with the positioning environment 1200 of FIG. 12. In this example, target UE1 has the same serving cell TRP1 as sidelink UE2 and sidelink UE3. However, sidelink UE4 is associated with serving cell TRP3. Using the serving cell criterion as an indication of whether a serving cell is within the threshold distance, sidelink UE2 and sidelink UE3 are assumed to be within the threshold distance of target UE1, while sidelink UE4 is assumed to be beyond the threshold distance of target UE1. Accordingly, target UE1 would not obtain or otherwise ignore post-measurement positioning AD from sidelink UE4.

With reference again to FIG. 10, only sidelink UEs within the threshold distance of target UE1 (i.e., as determined by target UE1 or the sidelink UEs) that have already performed positioning measurements during positioning sessions with LMF 270 will provide post-measurement positioning AD to target UE1. Target UE1 may select all or a subset of the responding sidelink UEs for provision of post-measurement positioning AD and establish a sidelink channel with each of them.

In the example shown in FIG. 10, each selected sidelink UE provides post-measurement positioning AD to target UE1 upon reception of a request from target UE1. If a sidelink UE is configured with a UE-assisted positioning mode, the post-measurement positioning AD sent by the sidelink UE may include one or more of 1) a reference signal received power (RSRP) measurement of the one or more PRS resources measured by the sidelink UE, 2) a reference-signal-time-difference (RSTD) measurement of the one or more PRS resources measured by the sidelink UE, 3) a LOS probability of one or more PRS resources determined by the sidelink UE, 4) one or more reception-to-reception (Rx-Rx) time difference measurement values measured by the sidelink UE, 5) one or more Rx-Tx time difference measurement values measured by the sidelink UE, 6) a reference signal received quality (RSRQ) measurement of one or more PRS resources measured by the sidelink UE, 7) an angle-of-arrival measurement of one or more PRS resources measured by the sidelink UE, 8) an identifier of a reference transmission/reception point (TRP) serving the sidelink UE, and/or 9) multipath profile indicators of one or more PRS resource measured by the sidelink UE. In an aspect, the multipath profile indicators may include 1) a location of a virtual base station (e.g., gNB) associated with the one or more PRS resources, 2) a delay spread of the one or more PRS resources measured by the sidelink UE, 3) a Doppler shift of one or more PRS resources measured by the sidelink UE, 4) a Doppler spread of one or more PRS resources measured by the sidelink UE, or any combination thereof. If the sidelink UE is configured with a UE-based positioning mode, outlier candidates in the measurements can also be indicated in the post-measurement positioning AD. In an aspect, a Rx-Rx time difference is a generalization of RSTD measurement. An RSTD can be considered and Rx-Rx time difference for only PRS resources, while an Rx-Rx measurement can be between any two resources (e.g., PRS and SRS, PRS and SL-PRS, etc.).

In an aspect, additionally, or alternatively, target UE1 may use the post-measurement positioning AD to determine outliers in its own PRS measurements.

In certain aspects, the sidelink UEs may transmit a compact representation of the post-measurement positioning AD. In an example, each sidelink UE may provide a list of identifiers for PRS resources measured by the sidelink UE to target UE1 as opposed to providing actual measurement values. In an aspect, target UE1 can prioritize the listed PRS resources for subsequent measurement, select only a subset of the listed of PRS resources for measurement based on the prioritized order, etc.

As shown in the example of FIG. 10, target UE1 receives post-measurement positioning AD from each of the sidelink UEs, although target UE1 may receive post-measurement positioning AD from less than all of the sidelink UEs depending on the relative locations of the sidelink UEs and target UE1 within the example positioning environment 1000. In this example, target UE1 receives positioning AD labeled "post-measurement positioning AD2" from sidelink UE2, positioning AD labeled "post-measurement positioning AD3" from sidelink UE3, and positioning AD labeled "post-measurement positioning AD4" from sidelink UE4. It is noted that the post-measurement positioning AD from the sidelink UEs may include measurements for some of the same PRS resources. In certain aspects, target UE1 is responsible for synthesizing the information from the multiple sets of post-measurement positioning AD to produce a measurement strategy.

During a positioning session, target UE1 may receive positioning AD (labeled "positioning AD-LMF") from the LMF 270. In accordance with certain aspects of the disclosure, target UE1 uses the post-measurement positioning AD to select which PRS resources of the positioning AD from the LMF 270 to measure during the positioning session. For example, target UE1 may selectively measure PRS resources of only a subset of the PRS resources included in the positioning assistance data from the location server based on the post-measurement positioning assistance data received from the sidelink UEs.

In accordance with certain aspects, the post-measurement positioning AD received by target UE1 from the sidelink UEs (labeled "post-measurement positioning AD2-AD4") may be sent by target UE1 to the LMF 270. In accordance with certain aspects of the disclosure, the LMF 270 may use the post-measurement positioning AD to determine the positioning AD-LMF sent to target UE1. Additionally, or alternatively, the sidelink UEs may provide their post-measurement positioning AD directly to the LMF 270.

The post-measurement positioning AD may be transmitted by the sidelink UEs in a periodic manner, a semi-periodic manner, and/or in an on-demand manner (e.g., in response to a request from target UE1 or other entity in the example positioning environment 1000). In accordance with certain aspects of the disclosure, each sidelink UE determines the information that is included in the post-measurement positioning AD that it sends to target UE1. As an example, each sidelink UE may opt to send only information meeting threshold criteria (e.g., PRS resources measured having an RSTD greater than a threshold or other relevant signal quality metric thresholds) in its post-measurement positioning AD.

In accordance with certain aspects of the disclosure, target UE1 may indicate to each sidelink UE the measurements and/or PRS resources that are to be included in the post-measurement positioning AD received from the sidelink UE. As an example, target UE1 may send a request for post-measurement positioning assistance data from one or more sidelink UEs over the one or more sidelink channels, where target UE1 specifies parameters of the post-measurement positioning assistance data that are requested to be included in the post-measurement positioning assistance data. In an aspect, the specified parameters in the request indicate the PRS resources that are requested for inclusion in the post-measurement positioning AD from the sidelink UEs. For example, instead of requesting post-measurement positioning AD on all configured PRS resources, target UE1 may specify a smaller subset of PRS resources for which it is requesting data.

In certain aspects, each sidelink UE can iteratively improve the post-measurement positioning AD across multiple measurement occasions (e.g., across multiple positioning sessions with the LMF 270). In an aspect, one or more of the sidelink UEs may be high capability UEs and may assist multiple nearby lower processing tier UEs with positioning by providing the lower tier UEs with post-measurement positioning AD that can be used to reduce the power and resources used by the lower-tier UEs in their positioning sessions.

Figure 13:
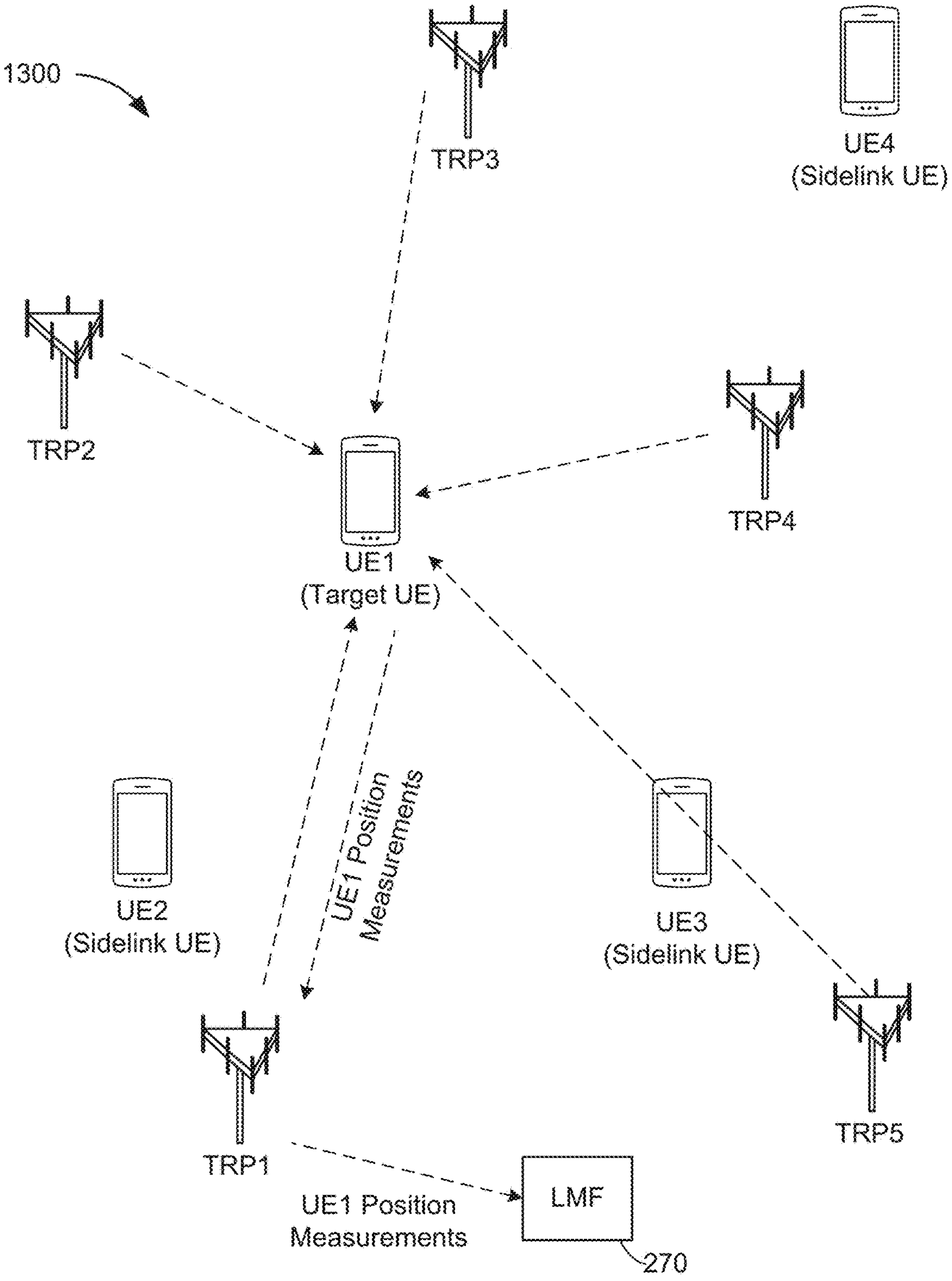
FIG. 13 is a diagram of an example positioning environment showing operations that may be executed in accordance with certain aspects of the disclosure.

FIG. 13 depicts an example positioning environment 1300 in which target UE1 measures one or more PRS in the positioning environment in accordance with certain aspects of the disclosure. In this example, target UE1 measures one or more resources from each of TRP1-TRP5. Target UE1 may report the positioning measurements to LMF 270 through serving cell TRP1. In certain aspects, target UE1 is able to determine its own position and may report the determined position to LMF 270.

Figure 14:
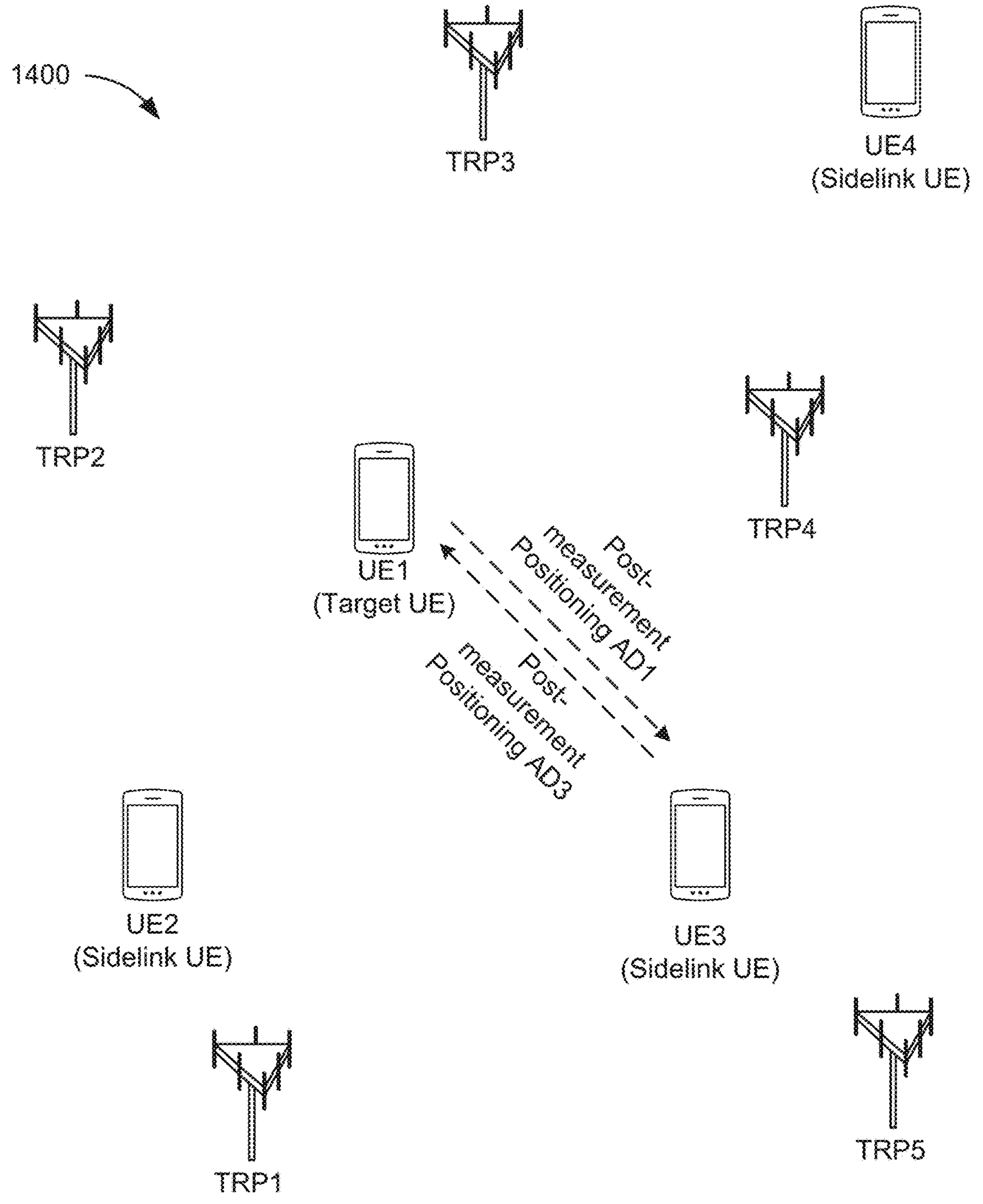
FIG. 14 is a diagram of an example positioning environment showing operations that may be executed in accordance with certain aspects of the disclosure.

In accordance with certain aspects of the disclosure, sidelink UEs in the positioning environment may exchange post-measurement positioning AD with other UEs in the positioning environment. FIG. 14 shows an example positioning environment 1400 in which target UE1 exchanges post-measurement positioning AD with sidelink UE3 in accordance with certain aspects of the disclosure. In this exchange, target UE1 provides post-measurement positioning AD (labeled "post-measurement positioning AD1") to sidelink UE3. Additionally, sidelink UE3 provides post-measurement positioning AD (labeled "post-measurement positioning AD3") to target UE1. As with other post-measurement positioning AD, the exchange between target UE1 and sidelink UE3 may be periodic, semi-periodic, and/or aperiodic (e.g., on-demand).

Figure 15:
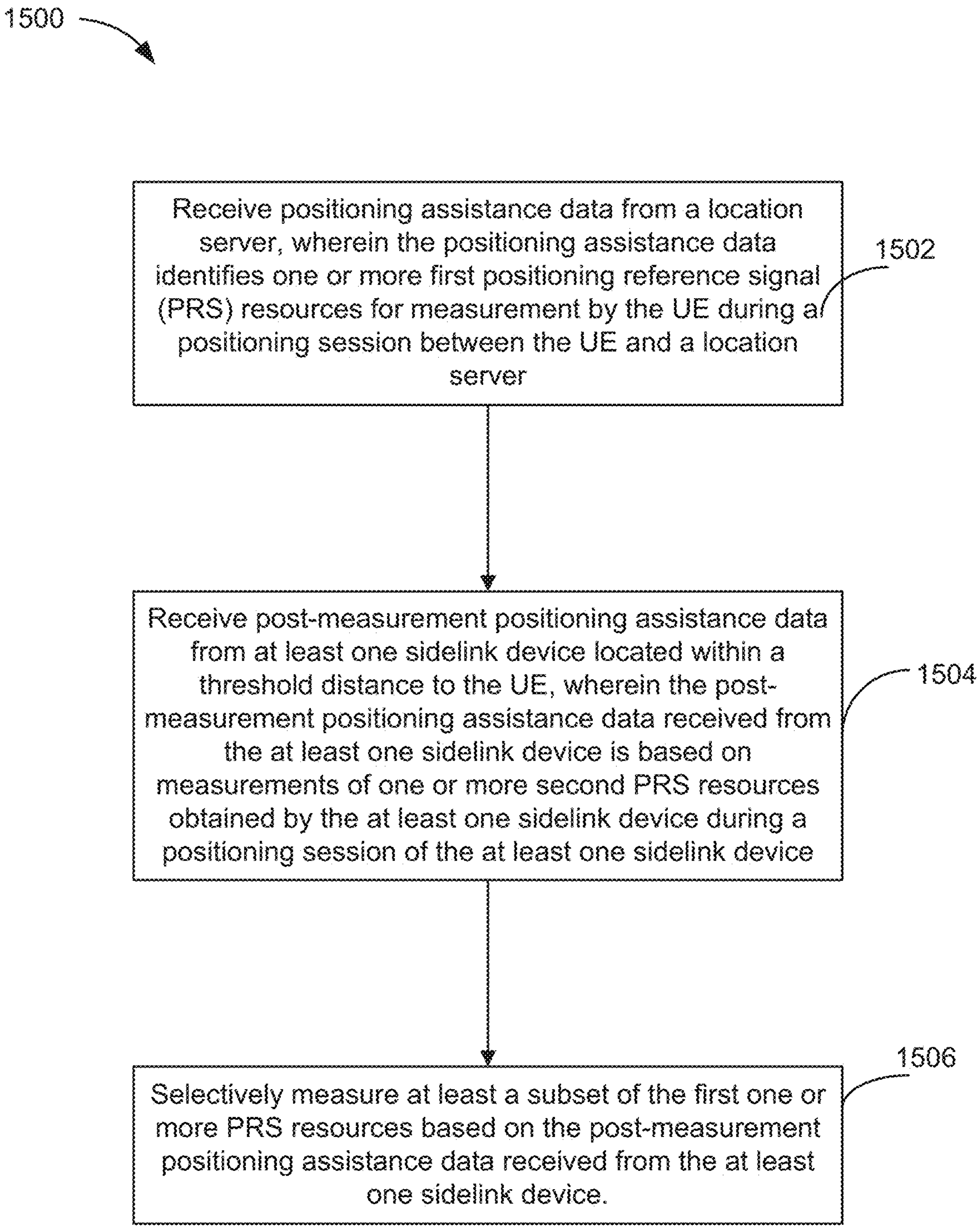
FIG. 15 illustrates an example method of wireless communication performed by a UE in accordance with certain aspects of the disclosure.

FIG. 15 illustrates an example method 1500 of wireless communication performed by a UE in accordance with certain aspects of the disclosure. At operation 1502, the UE receives positioning assistance data from a location server, wherein the positioning assistance data identifies one or more first positioning reference signal (PRS) resources for measurement by the UE during a positioning session between the UE and a location server. In an aspect, operation 1502 may be performed by the one or more WWAN transceivers 310, the one or more processors 332, memory 340, and/or positioning component 342, any or all of which may be considered means for performing this operation.

At operation 1504, the UE receives post-measurement positioning assistance data from at least one sidelink device located within a threshold distance to the UE, wherein the post-measurement positioning assistance data received from the at least one sidelink device is based on measurements of one or more second PRS resources obtained by the at least one sidelink device during a positioning session of the at least one sidelink device. In an aspect, operation 1504 may be performed by the one or more WWAN transceivers 310, the one or more processors 332, memory 340, and/or positioning component 342, any or all of which may be considered means for performing this operation.

In operation 1506, the UE selectively measures at least a subset of the one or more first PRS resources based on the post-measurement positioning assistance data received from the at least one sidelink device. In an aspect, operation 1506 may be performed by the one or more WWAN transceivers 310, the one or more processors 332, memory 340, and/or positioning component 342, any or all of which may be considered means for performing this operation.

Figure 16:
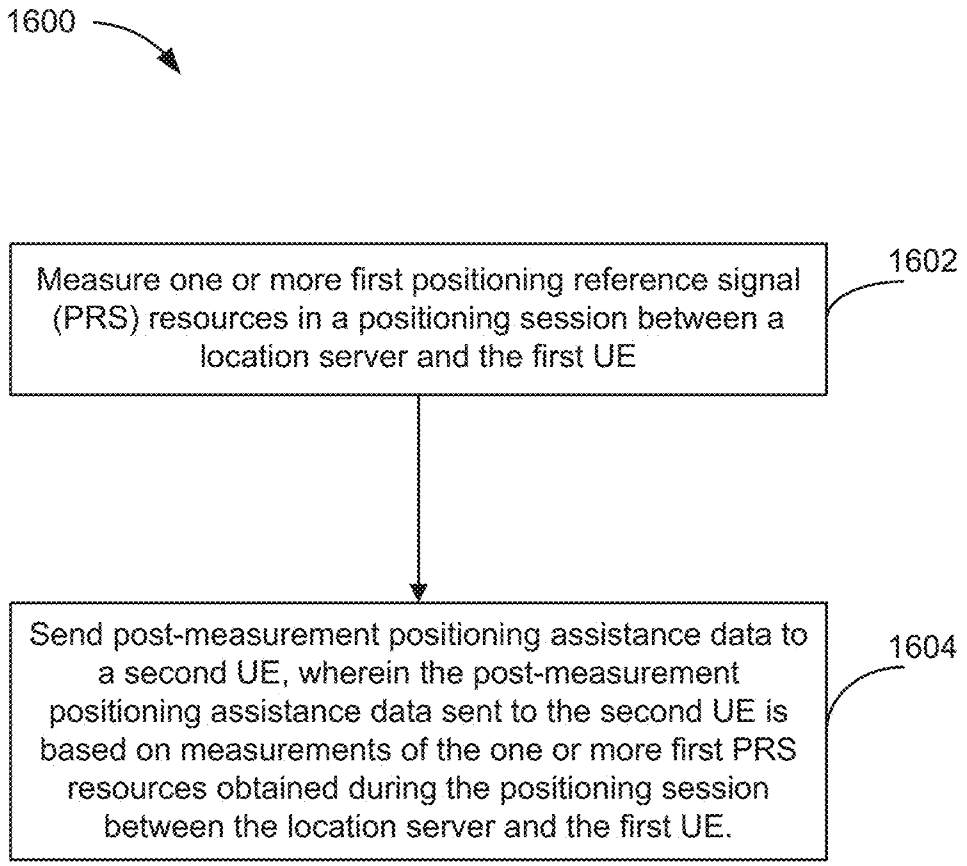
FIG. 16 illustrates an example method of wireless communication performed by a first UE in accordance with certain aspects of the disclosure.

FIG. 16 illustrates an example method 1600 of wireless communication performed by a first UE in accordance with certain aspects of the disclosure. At operation 1602, the first UE measures one or more first positioning reference signal (PRS) resources in a positioning session between a location server and the first UE. In an aspect, operation 1602 may be performed by the one or more WWAN transceivers 310, the one or more processors 332, memory 340, and/or positioning component 342, any or all of which may be considered means for performing this operation.

At operation 1604, the first UE post-measurement positioning assistance data to a second UE, wherein the post-measurement positioning assistance data sent to the second UE is based on measurements of the one or more first PRS resources obtained during the positioning session between the location server and the first UE. In an aspect, operation 1604 may be performed by the one or more WWAN transceivers 310, the one or more processors 332, memory 340, and/or positioning component 342, any or all of which may be considered means for performing this operation.

As will be appreciated, a technical advantage of methods 1500 and 1600 is that a UE may use the post-measurement positioning AD from sidelink UEs to optimize its measurement of PRS resources. In certain aspects, the UE may use the post-measurement positioning AD from sidelink UEs to choose which PRS resources it will measure based on quality metrics that can be obtained from the post-measurement positioning AD. In certain aspects, by choosing which PRS resources it will measure, the target UE may reduce the amount of power and resources used during a positioning session with an LMF. In an aspect, the target UE may indicate which PRS resources have good signal quality to the gNB and the gNB may turn off PRS resources having poor signal quality.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a user equipment (UE), comprising: receiving positioning assistance data from a location server, wherein the positioning assistance data identifies one or more first positioning reference signal (PRS) resources for measurement by the UE during a positioning session between the UE and a location server: receiving post-measurement positioning assistance data from at least one sidelink device located within a threshold distance to the UE, wherein the post-measurement positioning assistance data received from the at least one sidelink device is based on measurements of one or more second PRS resources obtained by the at least one sidelink device during a positioning session of the at least one sidelink device; and selectively measuring at least a subset of the one or more first PRS resources based on the post-measurement positioning assistance data received from the at least one sidelink device.

Clause 2. The method of clause 1, further comprising: requesting, by the UE, the post-measurement positioning assistance data from the at least one sidelink device, wherein the UE indicates parameters of the post-measurement positioning assistance data to be transmitted by the at least one sidelink device.

Clause 3. The method of clause 2, wherein: the parameters of the post-measurement positioning assistance data indicate PRS resources that are requested for inclusion in the post-measurement positioning assistance data from the at least one sidelink device.

Clause 4. The method of any of clauses 1 to 3, further comprising: receiving post-measurement assistance data from a plurality of sidelink devices: only post-measurement positioning assistance data received from a subset of sidelink devices of the plurality of sidelink devices is used in selectively measuring the subset of the one or more first PRS resources; and the subset of sidelink devices includes fewer sidelink devices than included in the plurality of sidelink devices.

Clause 5. The method of clause 4, further comprising: selecting the subset of sidelink devices based on one or more signal quality metrics obtained by the UE as a result of measuring one or more reference signals received from the plurality of sidelink devices.

Clause 6. The method of any of clauses 1 to 5, further comprising: reporting the post-measurement positioning assistance data received from the at least one sidelink device to the location server.

Clause 7. The method of any of clauses 1 to 6, further comprising: transmitting a set of post-measurement positioning assistance data from the UE to the at least one sidelink device, wherein the set of post-measurement positioning assistance data is based on measurements of one or more PRS resources measured by the UE during a positioning session.

Clause 8. The method of any of clauses 1 to 7, further comprising: prioritizing the one or more second PRS resources to determine the subset of the one or more first PRS resources that are selectively measured by the UE.

Clause 9. The method of clause 8, wherein: the one or more second PRS resources are prioritized using signal quality metrics of the one or more second PRS resources in the post-measurement positioning AD.

Clause 10. The method of any of clauses 1 to 9, wherein the post-measurement positioning assistance data received from the at least one sidelink device includes: a reference signal received power (RSRP) measurement of the one or more second PRS resources obtained by the at least one sidelink device; a reference-signal-time-difference measurement (RSTD) measurement of the one or more second PRS resources obtained by the at least one sidelink device: a line-of-site (LOS) probability of the one or more second PRS resources determined by the at least one sidelink device: a Rx-Rx time difference measurement based on the one or more second PRS resources obtained by the at least one sidelink device; a Rx-Tx time difference measurement based on the one or more second PRS resources obtained by the at least one sidelink device: a reference signal received quality (RSRQ) measurement of the one or more second PRS resources obtained by the at least one sidelink device; an angle-of-arrival measurement of the one or more second PRS resources obtained by the at least one sidelink device: an identifier of a reference transmission/reception point (TRP) serving the at least one sidelink device; one or more multipath profile indicators of the one or more second PRS resources obtained by the at least one sidelink device: or any combination thereof.

Clause 11. The method of clause 10, wherein the one or more multipath profile indicators include: a location of a virtual base station associated with the one or more second PRS resources measured by the at least one sidelink device; a delay spread of the one or more second PRS resources measured by the at least one sidelink device; a Doppler shift of the one or more second PRS resources measured by the at least one sidelink device; a Doppler spread of the one or more second PRS resources measured by the at least one sidelink device; or any combination thereof.

Clause 12. The method of any of clauses 1 to 11, further comprising: using the positioning assistance data received from the at least one sidelink device to identify outlier candidates in measurements of the subset of the one or more first PRS resources selectively measured by the UE.

Clause 13. The method of any of clauses 1 to 12, further comprising: using the positioning assistance data received from the at least one sidelink device to identify outlier candidates in measurements of the one or more second PRS resources obtained by the at least one sidelink device.

Clause 14. The method of any of clauses 1 to 13, wherein: the post-measurement positioning assistance data received from the at least one sidelink device is received from the at least one sidelink device in a prioritized order.

Clause 15. The method of any of clauses 1 to 14, wherein: the post-measurement positioning assistance data received from the at least one sidelink device is received periodically from the at least one sidelink device, received semi-periodically from the at least one sidelink device, received on-demand from the at least sidelink device in response to one or more requests for post-measurement positioning assistance data by the UE, or any combination thereof.

Clause 16. A method of wireless communication performed by a first user equipment (UE), comprising: measuring one or more first positioning reference signal (PRS) resources in a positioning session between a location server and the first UE; sending post-measurement positioning assistance data to a second UE, wherein the post-measurement positioning assistance data sent to the second UE is based on measurements of the one or more first PRS resources obtained during the positioning session between the location server and the first UE.

Clause 17. The method of clause 16, wherein: the post-measurement positioning assistance data is sent to the second UE periodically, sent to the second UE semi-periodically, sent to the second UE in response to one or more requests for post-measurement positioning assistance data received from the second UE, or any combination thereof.

Clause 18. The method of clause 17, wherein: the one or more requests for the post-measurement positioning assistance data include parameters of the post-measurement positioning assistance data that are requested to be sent to the second UE in the post-measurement positioning assistance data.

Clause 19. The method of clause 18, wherein: the parameters of the post-measurement positioning assistance data indicate PRS resources that are requested to be included in the post-measurement positioning assistance data from the at least one sidelink device.

Clause 20. The method of any of clauses 16 to 19, wherein: only post-measurement positioning assistance data for measurements of the one or more first PRS resources meeting a threshold signal quality metric are included in the post-measurement positioning assistance data sent to the second UE.

Clause 21. The method of any of clauses 16 to 20, further comprising reporting the post-measurement positioning assistance data to the location server.

Clause 22. The method of any of clauses 16 to 21, further comprising: prioritizing measurements of the one or more first PRS resources sent to the second UE in the post-measurement positioning assistance data.

Clause 23. The method of clause 22, wherein: the measurements are prioritized using signal quality metrics of the one or more first PRS resources measured by the first UE during the positioning session between the first UE and the location server.

Clause 24. The method of any of clauses 16 to 23, wherein the post-measurement positioning assistance data sent to the second UE includes: a reference signal received power (RSRP) measurement of the one or more first PRS resources obtained by the first UE: a reference-signal-time-difference measurement (RSTD) measurement of the one or more first PRS resources obtained by the first UE: a line-of-site (LOS) probability of the one or more first PRS resources determined by the first UE: a Rx-Rx time difference measurement based on the one or more PRS first resources obtained by the first UE; a Rx-Tx time difference measurement based on the one or more first PRS resources obtained by the first UE; a reference signal received quality (RSRQ) measurement of the one or more first PRS resources obtained by the first UE; an angle-of-arrival measurement of the one or more first PRS resources obtained by the first UE: an identifier of a reference transmission/reception point (TRP) serving the first UE; a multipath profile indicator of one or more first PRS resources obtained by the first UE: or any combination thereof.

Clause 25. The method of clause 24, wherein the multipath profile indicator includes: a location of a virtual base station associated with the one or more first PRS resources: a delay spread of the one or more first PRS resources obtained by the first UE; a Doppler shift of the one or more first PRS resources obtained by the first UE: a Doppler spread of the one or more first PRS resources obtained by the first UE: or any combination thereof.

Clause 26. The method of any of clauses 16 to 25, further comprising: receiving post-measurement positioning assistance data from the second UE, wherein the post-measurement positioning assistance data received from the second UE corresponds to measurements of one or more second PRS resources measured by the second UE during a positioning session between the second UE and the location server: and using the post-measurement positioning assistance data from the second UE in a further positioning session between the first UE and the location server.

Clause 27. A user equipment (UE), comprising: a memory: at least one transceiver: and at least one processor communicatively coupled to the memory and the at least one transceiver, the at least one processor configured to: receive, via the at least one transceiver, positioning assistance data from a location server, wherein the positioning assistance data identifies one or more first positioning reference signal (PRS) resources for measurement by the UE during a positioning session between the UE and a location server; receive, via the at least one transceiver, post-measurement positioning assistance data from at least one sidelink device located within a threshold distance to the UE, wherein the post-measurement positioning assistance data received from the at least one sidelink device is based on measurements of one or more second PRS resources obtained by the at least one sidelink device during a positioning session of the at least one sidelink device; and selectively measure at least a subset of the one or more first PRS resources based on the post-measurement positioning assistance data received from the at least one sidelink device.

Clause 28. The UE of clause 27, wherein the at least one processor is further configured to: request the post-measurement positioning assistance data from the at least one sidelink device, wherein the UE indicates parameters of the post-measurement positioning assistance data to be transmitted by the at least one sidelink device.

Clause 29. The UE of clause 28, wherein: the parameters of the post-measurement positioning assistance data indicate PRS resources that are requested for inclusion in the post-measurement positioning assistance data from the at least one sidelink device.

Clause 30. The UE of any of clauses 27 to 29, wherein the at least one processor is further configured to: receive, via the at least one transceiver, post-measurement assistance data from a plurality of sidelink devices: only post-measurement positioning assistance data received from a subset of sidelink devices of the plurality of sidelink devices is used in selectively measuring the subset of the one or more first PRS resources: and the subset of sidelink devices includes fewer sidelink devices than included in the plurality of sidelink devices.

Clause 31. The UE of clause 30, wherein the at least one processor is further configured to: select the subset of sidelink devices based on one or more signal quality metrics obtained by the UE as a result of measuring one or more reference signals received from the plurality of sidelink devices.

Clause 32. The UE of any of clauses 27 to 31, wherein the at least one processor is further configured to: report, via the at least one transceiver, the post-measurement positioning assistance data received from the at least one sidelink device to the location server.

Clause 33. The UE of any of clauses 27 to 32, wherein the at least one processor is further configured to: transmit, via the at least one transceiver, a set of post-measurement positioning assistance data from the UE to the at least one sidelink device, wherein the set of post-measurement positioning assistance data is based on measurements of one or more PRS resources measured by the UE during a positioning session.

Clause 34. The UE of any of clauses 27 to 33, wherein the at least one processor is further configured to: prioritize the one or more second PRS resources to determine the subset of the one or more first PRS resources that are selectively measured by the UE.

Clause 35. The UE of clause 34, wherein: the one or more second PRS resources are prioritized using signal quality metrics of the one or more second PRS resources in the post-measurement positioning AD.

Clause 36. The UE of any of clauses 27 to 35, wherein the post-measurement positioning assistance data received from the at least one sidelink device includes: a reference signal received power (RSRP) measurement of the one or more second PRS resources obtained by the at least one sidelink device: a reference-signal-time-difference measurement (RSTD) measurement of the one or more second PRS resources obtained by the at least one sidelink device: a line-of-site (LOS) probability of the one or more second PRS resources determined by the at least one sidelink device: a Rx-Rx time difference measurement based on the one or more second PRS resources obtained by the at least one sidelink device; a Rx-Tx time difference measurement based on the one or more second PRS resources obtained by the at least one sidelink device; a reference signal received quality (RSRQ) measurement of the one or more second PRS resources obtained by the at least one sidelink device; an angle-of-arrival measurement of the one or more second PRS resources obtained by the at least one sidelink device: an identifier of a reference transmission/reception point (TRP) serving the at least one sidelink device: one or more multipath profile indicators of the one or more second PRS resources obtained by the at least one sidelink device: or any combination thereof.

Clause 37. The UE of clause 36, wherein the one or more multipath profile indicators include: a location of a virtual base station associated with the one or more second PRS resources measured by the at least one sidelink device: a delay spread of the one or more second PRS resources measured by the at least one sidelink device; a Doppler shift of the one or more second PRS resources measured by the at least one sidelink device; a Doppler spread of the one or more second PRS resources measured by the at least one sidelink device; or any combination thereof.

Clause 38. The UE of any of clauses 27 to 37, wherein the at least one processor is further configured to: use the positioning assistance data received from the at least one sidelink device to identify outlier candidates in measurements of the subset of the one or more first PRS resources selectively measured by the UE.

Clause 39. The UE of any of clauses 27 to 38, wherein the at least one processor is further configured to: use the positioning assistance data received from the at least one sidelink device to identify outlier candidates in measurements of the one or more second PRS resources obtained by the at least one sidelink device.

Clause 40. The UE of any of clauses 27 to 39, wherein: the post-measurement positioning assistance data received from the at least one sidelink device is received from the at least one sidelink device in a prioritized order.

Clause 41. The UE of any of clauses 27 to 40, wherein: the post-measurement positioning assistance data received from the at least one sidelink device is received periodically from the at least one sidelink device, received semi-periodically from the at least one sidelink device, received on-demand from the at least sidelink device in response to one or more requests for post-measurement positioning assistance data by the UE, or any combination thereof.

Clause 42. A first user equipment (UE), comprising: a memory; at least one transceiver; and at least one processor communicatively coupled to the memory and the at least one transceiver, the at least one processor configured to: measure one or more first positioning reference signal (PRS) resources in a positioning session between a location server and the first UE; send, via the at least one transceiver, post-measurement positioning assistance data to a second UE, wherein the post-measurement positioning assistance data sent to the second UE is based on measurements of the one or more first PRS resources obtained during the positioning session between the location server and the first UE.

Clause 43. The UE of clause 42, wherein: the post-measurement positioning assistance data is sent to the second UE periodically, sent to the second UE semi-periodically, sent to the second UE in response to one or more requests for post-measurement positioning assistance data received from the second UE, or any combination thereof.

Clause 44. The UE of clause 43, wherein: the one or more requests for the post-measurement positioning assistance data include parameters of the post-measurement positioning assistance data that are requested to be sent to the second UE in the post-measurement positioning assistance data.

Clause 45. The UE of clause 44, wherein: the parameters of the post-measurement positioning assistance data indicate PRS resources that are requested to be included in the post-measurement positioning assistance data from the at least one sidelink device.

Clause 46. The UE of any of clauses 42 to 45, wherein: only post-measurement positioning assistance data for measurements of the one or more first PRS resources meeting a threshold signal quality metric are included in the post-measurement positioning assistance data sent to the second UE.

Clause 47. The UE of any of clauses 42 to 46, wherein the at least one processor is further configured to: report, via the at least one transceiver, the post-measurement positioning assistance data to the location server.

Clause 48. The UE of any of clauses 42 to 47, wherein the at least one processor is further configured to: prioritize measurements of the one or more first PRS resources sent to the second UE in the post-measurement positioning assistance data.

Clause 49. The UE of clause 48, wherein: the measurements are prioritized using signal quality metrics of the one or more first PRS resources measured by the first UE during the positioning session between the first UE and the location server.

Clause 50. The UE of any of clauses 42 to 49, wherein the post-measurement positioning assistance data sent to the second UE includes: a reference signal received power (RSRP) measurement of the one or more first PRS resources obtained by the first UE: a reference-signal-time-difference measurement (RSTD) measurement of the one or more first PRS resources obtained by the first UE; a line-of-site (LOS) probability of the one or more first PRS resources determined by the first UE: a Rx-Rx time difference measurement based on the one or more PRS first resources obtained by the first UE; a Rx-Tx time difference measurement based on the one or more first PRS resources obtained by the first UE; a reference signal received quality (RSRQ) measurement of the one or more first PRS resources obtained by the first UE; an angle-of-arrival measurement of the one or more first PRS resources obtained by the first UE: an identifier of a reference transmission/reception point (TRP) serving the first UE: a multipath profile indicator of one or more first PRS resources obtained by the first UE: or any combination thereof.

Clause 51. The UE of clause 50, wherein the multipath profile indicator includes: a location of a virtual base station associated with the one or more first PRS resources: a delay spread of the one or more first PRS resources obtained by the first UE; a Doppler shift of the one or more first PRS resources obtained by the first UE: a Doppler spread of the one or more first PRS resources obtained by the first UE: or any combination thereof.

Clause 52. The UE of any of clauses 42 to 51, wherein the at least one processor is further configured to: receive, via the at least one transceiver, post-measurement positioning assistance data from the second UE, wherein the post-measurement positioning assistance data received from the second UE corresponds to measurements of one or more second PRS resources measured by the second UE during a positioning session between the second UE and the location server: and use the post-measurement positioning assistance data from the second UE in a further positioning session between the first UE and the location server.

Clause 53. A user equipment (UE), comprising: means for receiving positioning assistance data from a location server, wherein the positioning assistance data identifies one or more first positioning reference signal (PRS) resources for measurement by the UE during a positioning session between the UE and a location server; means for receiving post-measurement positioning assistance data from at least one sidelink device located within a threshold distance to the UE, wherein the post-measurement positioning assistance data received from the at least one sidelink device is based on measurements of one or more second PRS resources obtained by the at least one sidelink device during a positioning session of the at least one sidelink device; and means for selectively measuring at least a subset of the one or more first PRS resources based on the post-measurement positioning assistance data received from the at least one sidelink device.

Clause 54. The UE of clause 53, further comprising: means for requesting the post-measurement positioning assistance data from the at least one sidelink device, wherein the UE indicates parameters of the post-measurement positioning assistance data to be transmitted by the at least one sidelink device.

Clause 55. The UE of clause 54, wherein: the parameters of the post-measurement positioning assistance data indicate PRS resources that are requested for inclusion in the post-measurement positioning assistance data from the at least one sidelink device.

Clause 56. The UE of any of clauses 53 to 55, further comprising: means for receiving post-measurement assistance data from a plurality of sidelink devices: means for only posting-measurement positioning assistance data received from a subset of sidelink devices of the plurality of sidelink devices is used in selectively measuring the subset of the one or more first PRS resources: and the subset of sidelink devices includes fewer sidelink devices than included in the plurality of sidelink devices.

Clause 57. The UE of clause 56, further comprising: means for selecting the subset of sidelink devices based on one or more signal quality metrics obtained by the UE as a result of measuring one or more reference signals received from the plurality of sidelink devices.

Clause 58. The UE of any of clauses 53 to 57, further comprising: means for reporting the post-measurement positioning assistance data received from the at least one sidelink device to the location server.

Clause 59. The UE of any of clauses 53 to 58, further comprising: means for transmitting a set of post-measurement positioning assistance data from the UE to the at least one sidelink device, wherein the set of post-measurement positioning assistance data is based on measurements of one or more PRS resources measured by the UE during a positioning session.

Clause 60. The UE of any of clauses 53 to 59, further comprising: means for prioritizing the one or more second PRS resources to determine the subset of the one or more first PRS resources that are selectively measured by the UE.

Clause 61. The UE of clause 60, wherein: the one or more second PRS resources are prioritized using signal quality metrics of the one or more second PRS resources in the post-measurement positioning AD.

Clause 62. The UE of any of clauses 53 to 61, wherein the post-measurement positioning assistance data received from the at least one sidelink device includes: a reference signal received power (RSRP) measurement of the one or more second PRS resources obtained by the at least one sidelink device: a reference-signal-time-difference measurement (RSTD) measurement of the one or more second PRS resources obtained by the at least one sidelink device: a line-of-site (LOS) probability of the one or more second PRS resources determined by the at least one sidelink device; a Rx-Rx time difference measurement based on the one or more second PRS resources obtained by the at least one sidelink device; a Rx-Tx time difference measurement based on the one or more second PRS resources obtained by the at least one sidelink device; a reference signal received quality (RSRQ) measurement of the one or more second PRS resources obtained by the at least one sidelink device; an angle-of-arrival measurement of the one or more second PRS resources obtained by the at least one sidelink device; an identifier of a reference transmission/reception point (TRP) serving the at least one sidelink device; one or more multipath profile indicators of the one or more second PRS resources obtained by the at least one sidelink device; or any combination thereof.

Clause 63. The UE of clause 62, wherein the one or more multipath profile indicators include: a location of a virtual base station associated with the one or more second PRS resources measured by the at least one sidelink device; a delay spread of the one or more second PRS resources measured by the at least one sidelink device: a Doppler shift of the one or more second PRS resources measured by the at least one sidelink device; a Doppler spread of the one or more second PRS resources measured by the at least one sidelink device; or any combination thereof.

Clause 64. The UE of any of clauses 53 to 63, further comprising: means for using the positioning assistance data received from the at least one sidelink device to identify outlier candidates in measurements of the subset of the one or more first PRS resources selectively measured by the UE.

Clause 65. The UE of any of clauses 53 to 64, further comprising: means for using the positioning assistance data received from the at least one sidelink device to identify outlier candidates in measurements of the one or more second PRS resources obtained by the at least one sidelink device.

Clause 66. The UE of any of clauses 53 to 65, wherein: the post-measurement positioning assistance data received from the at least one sidelink device is received from the at least one sidelink device in a prioritized order.

Clause 67. The UE of any of clauses 53 to 66, wherein: the post-measurement positioning assistance data received from the at least one sidelink device is received periodically from the at least one sidelink device, received semi-periodically from the at least one sidelink device, received on-demand from the at least sidelink device in response to one or more requests for post-measurement positioning assistance data by the UE, or any combination thereof.

Clause 68. A first user equipment (UE), comprising: means for measuring one or more first positioning reference signal (PRS) resources in a positioning session between a location server and the first UE; means for sending post-measurement positioning assistance data to a second UE, wherein the post-measurement positioning assistance data sent to the second UE is based on measurements of the one or more first PRS resources obtained during the positioning session between the location server and the first UE.

Clause 69. The UE of clause 68, wherein: the post-measurement positioning assistance data is sent to the second UE periodically, sent to the second UE semi-periodically, sent to the second UE in response to one or more requests for post-measurement positioning assistance data received from the second UE, or any combination thereof.

Clause 70. The UE of clause 69, wherein: the one or more requests for the post-measurement positioning assistance data include parameters of the post-measurement positioning assistance data that are requested to be sent to the second UE in the post-measurement positioning assistance data.

Clause 71. The UE of clause 70, wherein: the parameters of the post-measurement positioning assistance data indicate PRS resources that are requested to be included in the post-measurement positioning assistance data from the at least one sidelink device.

Clause 72. The UE of any of clauses 68 to 71, wherein: means for only posting-measurement positioning assistance data for measurements of the one or more first PRS resources meeting a threshold signal quality metric are included in the post-measurement positioning assistance data sent to the second UE.

Clause 73. The UE of any of clauses 68 to 72, further comprising means for reporting the post-measurement positioning assistance data to the location server.

Clause 74. The UE of any of clauses 68 to 73, further comprising: means for prioritizing measurements of the one or more first PRS resources sent to the second UE in the post-measurement positioning assistance data.

Clause 75. The UE of clause 74, wherein: the measurements are prioritized using signal quality metrics of the one or more first PRS resources measured by the first UE during the positioning session between the first UE and the location server.

Clause 76. The UE of any of clauses 68 to 75, wherein the post-measurement positioning assistance data sent to the second UE includes: a reference signal received power (RSRP) measurement of the one or more first PRS resources obtained by the first UE; a reference-signal-time-difference measurement (RSTD) measurement of the one or more first PRS resources obtained by the first UE; a line-of-site (LOS) probability of the one or more first PRS resources determined by the first UE; a Rx-Rx time difference measurement based on the one or more PRS first resources obtained by the first UE: a Rx-Tx time difference measurement based on the one or more first PRS resources obtained by the first UE: a reference signal received quality (RSRQ) measurement of the one or more first PRS resources obtained by the first UE: an angle-of-arrival measurement of the one or more first PRS resources obtained by the first UE: an identifier of a reference transmission/reception point (TRP) serving the first UE: a multipath profile indicator of one or more first PRS resources obtained by the first UE; or any combination thereof.

Clause 77. The UE of clause 76, wherein the multipath profile indicator includes: a location of a virtual base station associated with the one or more first PRS resources: a delay spread of the one or more first PRS resources obtained by the first UE; a Doppler shift of the one or more first PRS resources obtained by the first UE; a Doppler spread of the one or more first PRS resources obtained by the first UE; or any combination thereof.

Clause 78. The UE of any of clauses 68 to 77, further comprising: means for receiving post-measurement positioning assistance data from the second UE, wherein the post-measurement positioning assistance data received from the second UE corresponds to measurements of one or more second PRS resources measured by the second UE during a positioning session between the second UE and the location server: and means for using the post-measurement positioning assistance data from the second UE in a further positioning session between the first UE and the location server.

Clause 79. A non-transitory computer-readable medium storing computer-executable instructions that, when executed by a user equipment (UE), cause the UE to: receive positioning assistance data from a location server, wherein the positioning assistance data identifies one or more first positioning reference signal (PRS) resources for measurement by the UE during a positioning session between the UE and a location server; receive post-measurement positioning assistance data from at least one sidelink device located within a threshold distance to the UE, wherein the post-measurement positioning assistance data received from the at least one sidelink device is based on measurements of one or more second PRS resources obtained by the at least one sidelink device during a positioning session of the at least one sidelink device: and selectively measure at least a subset of the one or more first PRS resources based on the post-measurement positioning assistance data received from the at least one sidelink device.

Clause 80. The non-transitory computer-readable medium of clause 79, further comprising computer-executable instructions that, when executed by the UE, cause the UE to: request the post-measurement positioning assistance data from the at least one sidelink device, wherein the UE indicates parameters of the post-measurement positioning assistance data to be transmitted by the at least one sidelink device.

Clause 81. The non-transitory computer-readable medium of clause 80, wherein: the parameters of the post-measurement positioning assistance data indicate PRS resources that are requested for inclusion in the post-measurement positioning assistance data from the at least one sidelink device.

Clause 82. The non-transitory computer-readable medium of any of clauses 79 to 81, further comprising computer-executable instructions that, when executed by the UE, cause the UE to: receive post-measurement assistance data from a plurality of sidelink devices: only post-measurement positioning assistance data received from a subset of sidelink devices of the plurality of sidelink devices is used in selectively measuring the subset of the one or more first PRS resources; and the subset of sidelink devices includes fewer sidelink devices than included in the plurality of sidelink devices.

Clause 83. The non-transitory computer-readable medium of clause 82, further comprising computer-executable instructions that, when executed by the UE, cause the UE to: select the subset of sidelink devices based on one or more signal quality metrics obtained by the UE as a result of measuring one or more reference signals received from the plurality of sidelink devices.

Clause 84. The non-transitory computer-readable medium of any of clauses 79 to 83, further comprising computer-executable instructions that, when executed by the UE, cause the UE to: report the post-measurement positioning assistance data received from the at least one sidelink device to the location server.

Clause 85. The non-transitory computer-readable medium of any of clauses 79 to 84, further comprising computer-executable instructions that, when executed by the UE, cause the UE to: transmit a set of post-measurement positioning assistance data from the UE to the at least one sidelink device, wherein the set of post-measurement positioning assistance data is based on measurements of one or more PRS resources measured by the UE during a positioning session.

Clause 86. The non-transitory computer-readable medium of any of clauses 79 to 85, further comprising computer-executable instructions that, when executed by the UE, cause the UE to: prioritize the one or more second PRS resources to determine the subset of the one or more first PRS resources that are selectively measured by the UE.

Clause 87. The non-transitory computer-readable medium of clause 86, wherein: the one or more second PRS resources are prioritized using signal quality metrics of the one or more second PRS resources in the post-measurement positioning AD.

Clause 88. The non-transitory computer-readable medium of any of clauses 79 to 87, wherein the post-measurement positioning assistance data received from the at least one sidelink device includes: a reference signal received power (RSRP) measurement of the one or more second PRS resources obtained by the at least one sidelink device: a reference-signal-time-difference measurement (RSTD) measurement of the one or more second PRS resources obtained by the at least one sidelink device; a line-of-site (LOS) probability of the one or more second PRS resources determined by the at least one sidelink device: a Rx-Rx time difference measurement based on the one or more second PRS resources obtained by the at least one sidelink device; a Rx-Tx time difference measurement based on the one or more second PRS resources obtained by the at least one sidelink device: a reference signal received quality (RSRQ) measurement of the one or more second PRS resources obtained by the at least one sidelink device; an angle-of-arrival measurement of the one or more second PRS resources obtained by the at least one sidelink device; an identifier of a reference transmission/reception point (TRP) serving the at least one sidelink device; one or more multipath profile indicators of the one or more second PRS resources obtained by the at least one sidelink device: or any combination thereof.

Clause 89. The non-transitory computer-readable medium of clause 88, wherein the one or more multipath profile indicators include: a location of a virtual base station associated with the one or more second PRS resources measured by the at least one sidelink device; a delay spread of the one or more second PRS resources measured by the at least one sidelink device: a Doppler shift of the one or more second PRS resources measured by the at least one sidelink device: a Doppler spread of the one or more second PRS resources measured by the at least one sidelink device: or any combination thereof.

Clause 90. The non-transitory computer-readable medium of any of clauses 79 to 89, further comprising computer-executable instructions that, when executed by the UE, cause the UE to: use the positioning assistance data received from the at least one sidelink device to identify outlier candidates in measurements of the subset of the one or more first PRS resources selectively measured by the UE.

Clause 91. The non-transitory computer-readable medium of any of clauses 79 to 90, further comprising computer-executable instructions that, when executed by the UE, cause the UE to: use the positioning assistance data received from the at least one sidelink device to identify outlier candidates in measurements of the one or more second PRS resources obtained by the at least one sidelink device.

Clause 92. The non-transitory computer-readable medium of any of clauses 79 to 91, wherein: the post-measurement positioning assistance data received from the at least one sidelink device is received from the at least one sidelink device in a prioritized order.

Clause 93. The non-transitory computer-readable medium of any of clauses 79 to 92, wherein: the post-measurement positioning assistance data received from the at least one sidelink device is received periodically from the at least one sidelink device, received semi-periodically from the at least one sidelink device, received on-demand from the at least sidelink device in response to one or more requests for post-measurement positioning assistance data by the UE, or any combination thereof.

Clause 94. A non-transitory computer-readable medium storing computer-executable instructions that, when executed by a first user equipment (UE), cause the UE to: measure one or more first positioning reference signal (PRS) resources in a positioning session between a location server and the first UE; send post-measurement positioning assistance data to a second UE, wherein the post-measurement positioning assistance data sent to the second UE is based on measurements of the one or more first PRS resources obtained during the positioning session between the location server and the first UE.

Clause 95. The non-transitory computer-readable medium of clause 94, wherein: the post-measurement positioning assistance data is sent to the second UE periodically, sent to the second UE semi-periodically, sent to the second UE in response to one or more requests for post-measurement positioning assistance data received from the second UE, or any combination thereof.

Clause 96. The non-transitory computer-readable medium of clause 95, wherein: the one or more requests for the post-measurement positioning assistance data include parameters of the post-measurement positioning assistance data that are requested to be sent to the second UE in the post-measurement positioning assistance data.

Clause 97. The non-transitory computer-readable medium of clause 96, wherein: the parameters of the post-measurement positioning assistance data indicate PRS resources that are requested to be included in the post-measurement positioning assistance data from the at least one sidelink device.

Clause 98. The non-transitory computer-readable medium of any of clauses 94 to 97, wherein: only post-measurement positioning assistance data for measurements of the one or more first PRS resources meeting a threshold signal quality metric are included in the post-measurement positioning assistance data sent to the second UE.

Clause 99. The non-transitory computer-readable medium of any of clauses 94 to 98, further comprising computer-executable instructions that, when executed by the UE, cause the UE to report the post-measurement positioning assistance data to the location server.

Clause 100. The non-transitory computer-readable medium of any of clauses 94 to 99, further comprising computer-executable instructions that, when executed by the UE, cause the UE to: prioritize measurements of the one or more first PRS resources sent to the second UE in the post-measurement positioning assistance data.

Clause 101. The non-transitory computer-readable medium of clause 100, wherein: the measurements are prioritized using signal quality metrics of the one or more first PRS resources measured by the first UE during the positioning session between the first UE and the location server.

Clause 102. The non-transitory computer-readable medium of any of clauses 94 to 101, wherein the post-measurement positioning assistance data sent to the second UE includes: a reference signal received power (RSRP) measurement of the one or more first PRS resources obtained by the first UE; a reference-signal-time-difference measurement (RSTD) measurement of the one or more first PRS resources obtained by the first UE: a line-of-site (LOS) probability of the one or more first PRS resources determined by the first UE; a Rx-Rx time difference measurement based on the one or more PRS first resources obtained by the first UE: a Rx-Tx time difference measurement based on the one or more first PRS resources obtained by the first UE: a reference signal received quality (RSRQ) measurement of the one or more first PRS resources obtained by the first UE;

an angle-of-arrival measurement of the one or more first PRS resources obtained by the first UE: an identifier of a reference transmission/reception point (TRP) serving the first UE: a multipath profile indicator of one or more first PRS resources obtained by the first UE: or any combination thereof.

Clause 103. The non-transitory computer-readable medium of clause 102, wherein the multipath profile indicator includes: a location of a virtual base station associated with the one or more first PRS resources: a delay spread of the one or more first PRS resources obtained by the first UE; a Doppler shift of the one or more first PRS resources obtained by the first UE; a Doppler spread of the one or more first PRS resources obtained by the first UE; or any combination thereof.

Clause 104. The non-transitory computer-readable medium of any of clauses 94 to 103, further comprising computer-executable instructions that, when executed by the UE, cause the UE to: receive post-measurement positioning assistance data from the second UE, wherein the post-measurement positioning assistance data received from the second UE corresponds to measurements of one or more second PRS resources measured by the second UE during a positioning session between the second UE and the location server; and use the post-measurement positioning assistance data from the second UE in a further positioning session between the first UE and the location server.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM. ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE), comprising:

receiving positioning assistance data from a location server, wherein the positioning assistance data identifies one or more first positioning reference signal (PRS) resources for measurement by the UE during a positioning session between the UE and a location server;

receiving post-measurement positioning assistance data from at least one sidelink device located within a threshold distance to the UE, wherein the post-measurement positioning assistance data received from the at least one sidelink device is based on measurements of one or more second PRS resources obtained by the at least one sidelink device during a positioning session of the at least one sidelink device; and selectively measuring at least a subset of the one or more first PRS resources based on the post-measurement positioning assistance data received from the at least one sidelink device.

2. The method of claim 1, further comprising:

requesting, by the UE, the post-measurement positioning assistance data from the at least one sidelink device, wherein the UE indicates parameters of the post-measurement positioning assistance data to be transmitted by the at least one sidelink device.

3. The method of claim 2, wherein:

the parameters of the post-measurement positioning assistance data indicate PRS resources that are requested for inclusion in the post-measurement positioning assistance data from the at least one sidelink device.

4. The method of claim 1, further comprising:

receiving post-measurement assistance data from a plurality of sidelink devices;

only post-measurement positioning assistance data received from a subset of sidelink devices of the plurality of sidelink devices is used in selectively measuring the subset of the one or more first PRS resources; and the subset of sidelink devices includes fewer sidelink devices than included in the plurality of sidelink devices.

5. The method of claim 4, further comprising:

selecting the subset of sidelink devices based on one or more signal quality metrics obtained by the UE as a result of measuring one or more reference signals received from the plurality of sidelink devices.

6. The method of claim 1, further comprising:

reporting the post-measurement positioning assistance data received from the at least one sidelink device to the location server.

7. The method of claim 1, further comprising:

transmitting a set of post-measurement positioning assistance data from the UE to the at least one sidelink device, wherein the set of post-measurement positioning assistance data is based on measurements of one or more PRS resources measured by the UE during a positioning session.

8. The method of claim 1, further comprising:

prioritizing the one or more second PRS resources to determine the subset of the one or more first PRS resources that are selectively measured by the UE.

9. The method of claim 8, wherein:

the one or more second PRS resources are prioritized using signal quality metrics of the one or more second PRS resources in the post-measurement positioning assistance data.

10. The method of claim 1, wherein the post-measurement positioning assistance data received from the at least one sidelink device includes:

a reference signal received power (RSRP) measurement of the one or more second PRS resources obtained by the at least one sidelink device;

a reference-signal-time-difference measurement (RSTD) measurement of the one or more second PRS resources obtained by the at least one sidelink device;

a line-of-site (LOS) probability of the one or more second PRS resources determined by the at least one sidelink device;

a Rx-Rx time difference measurement based on the one or more second PRS resources obtained by the at least one sidelink device;

a Rx-Tx time difference measurement based on the one or more second PRS resources obtained by the at least one sidelink device;

a reference signal received quality (RSRQ) measurement of the one or more second PRS resources obtained by the at least one sidelink device;

an angle-of-arrival measurement of the one or more second PRS resources obtained by the at least one sidelink device;

an identifier of a reference transmission/reception point (TRP) serving the at least one sidelink device;

one or more multipath profile indicators of the one or more second PRS resources obtained by the at least one sidelink device; or any combination thereof.

11. The method of claim 10, wherein the one or more multipath profile indicators include:

a location of a virtual base station associated with the one or more second PRS resources measured by the at least one sidelink device;

a delay spread of the one or more second PRS resources measured by the at least one sidelink device;

a Doppler shift of the one or more second PRS resources measured by the at least one sidelink device;

a Doppler spread of the one or more second PRS resources measured by the at least one sidelink device; or any combination thereof.

12. The method of claim 1, further comprising:

using the post-measurement positioning assistance data received from the at least one sidelink device to identify outlier candidates in measurements of the subset of the one or more first PRS resources selectively measured by the UE.

13. The method of claim 1, further comprising:

using the post-measurement positioning assistance data received from the at least one sidelink device to identify outlier candidates in measurements of the one or more second PRS resources obtained by the at least one sidelink device.

14. The method of claim 1, wherein:

the post-measurement positioning assistance data received from the at least one sidelink device is received from the at least one sidelink device in a prioritized order.

15. The method of claim 1, wherein:

the post-measurement positioning assistance data received from the at least one sidelink device is received periodically from the at least one sidelink device, received semi-periodically from the at least one sidelink device, received on-demand from the at least one sidelink device in response to one or more requests for post-measurement positioning assistance data by the UE, or any combination thereof.

16. A method of wireless communication performed by a first user equipment (UE), comprising:

measuring one or more first positioning reference signal (PRS) resources in a positioning session between a location server and the first UE; and sending post-measurement positioning assistance data to a second UE, wherein the post-measurement positioning assistance data sent to the second UE is based on measurements of the one or more first PRS resources obtained during the positioning session between the location server and the first UE;

wherein the post-measurement positioning assistance data comprises reference signal received quality (RSRQ) information associated with one or more first PRS resources actually measured by the first UE during the positioning session;

an identification of the one or more first PRS resources actually measured by the first UE in during the positioning session;

an indication of a line-of-site probability associated with the one or more first PRS resources actually measured by the first UE during the positioning session;

one or more multipath profile indicators associated with the one or more first PRS resources actually measured by the first UE during the positioning session; or any combination thereof.

17. The method of claim 16, wherein:

the post-measurement positioning assistance data is sent to the second UE periodically, sent to the second UE semi-periodically, sent to the second UE in response to one or more requests for post-measurement positioning assistance data received from the second UE, or any combination thereof.

18. The method of claim 17, wherein:

the one or more requests for the post-measurement positioning assistance data include parameters of the post-measurement positioning assistance data that are requested to be sent to the second UE in the post-measurement positioning assistance data.

19. The method of claim 18, wherein:

the parameters of the post-measurement positioning assistance data indicate PRS resources that are requested to be included in the post-measurement positioning assistance data from the first UE.

20. The method of claim 16, wherein:

only post-measurement positioning assistance data for measurements of the one or more first PRS resources meeting a threshold signal quality metric are included in the post-measurement positioning assistance data sent to the second UE.

21. The method of claim 16, further comprising reporting the post-measurement positioning assistance data to the location server.

22. The method of claim 16, further comprising:

prioritizing measurements of the one or more first PRS resources sent to the second UE in the post-measurement positioning assistance data.

23. The method of claim 22, wherein:

the measurements are prioritized using signal quality metrics of the one or more first PRS resources measured by the first UE during the positioning session between the first UE and the location server.

24. The method of claim 16, wherein the post-measurement positioning assistance data sent to the second UE further comprises:

an angle-of-arrival measurement of associated with the one or more first PRS resources actually measured by the first UE;

an identifier of a reference transmission/reception point (TRP) associated with the first UE; or any combination thereof.

25. The method of claim 24, wherein the one or more multipath profile indicators includes:

a location of a virtual base station associated with the one or more first PRS resources;

a delay spread of the one or more first PRS resources obtained by the first UE;

a Doppler shift of the one or more first PRS resources obtained by the first UE;

a Doppler spread of the one or more first PRS resources obtained by the first UE; or any combination thereof.

26. The method of claim 16, further comprising:

receiving post-measurement positioning assistance data from the second UE, wherein the post-measurement positioning assistance data received from the second UE corresponds to measurements of one or more second PRS resources measured by the second UE during a positioning session between the second UE and the location server; and using the post-measurement positioning assistance data from the second UE to select which PRS resources of the first PRS resources are measured by the first UE in a further positioning session between the first UE and the location server.

27. A user equipment (UE), comprising:

a memory;

at least one transceiver; and at least one processor communicatively coupled to the memory and the at least one transceiver, the at least one processor configured to:

receive, via the at least one transceiver, positioning assistance data from a location server, wherein the positioning assistance data identifies one or more first positioning reference signal (PRS) resources for measurement by the UE during a positioning session between the UE and a location server;

receive, via the at least one transceiver, post-measurement positioning assistance data from at least one sidelink device located within a threshold distance to the UE, wherein the post-measurement positioning assistance data received from the at least one sidelink device is based on measurements of one or more second PRS resources obtained by the at least one sidelink device during a positioning session of the at least one sidelink device; and selectively measure at least a subset of the one or more first PRS resources based on the post-measurement positioning assistance data received from the at least one sidelink device.

28. The UE of claim 27, wherein the at least one processor is further configured to:

receive, via the at least one transceiver, post-measurement assistance data from a plurality of sidelink devices;

only post-measurement positioning assistance data received from a subset of sidelink devices of the plurality of sidelink devices is used in selectively measuring the subset of the one or more first PRS resources; and the subset of sidelink devices includes fewer sidelink devices than included in the plurality of sidelink devices.

29. The UE of claim 28, wherein the at least one processor is further configured to:

select the subset of sidelink devices based on one or more signal quality metrics obtained by the UE as a result of measuring one or more reference signals received from the plurality of sidelink devices.

30. A first user equipment (UE), comprising:

a memory;

at least one transceiver; and at least one processor communicatively coupled to the memory and the at least one transceiver, the at least one processor configured to:

measure one or more positioning reference signal (PRS) resources in a positioning session between a location server and the first UE;

send, via the at least one transceiver, post-measurement positioning assistance data to a second UE, wherein the post-measurement positioning assistance data sent to the second UE, wherein the post-measurement positioning assistance data comprises reference signal received quality (RSRQ) information associated with one or more first PRS resources actually measured by the first UE during the positioning session;

an identification of the one or more first PRS resources actually measured by the first UE in during the positioning session;

an indication of a line-of-site probability associated with the one or more first PRS resources actually measured by the first UE during the positioning session;

one or more multipath profile indicators associated with the one or more first PRS resources actually measured by the first UE during the positioning session; or any combination thereof.

* * * * *